(12) United States Patent
Ward et al.

(10) Patent No.: US 12,227,316 B2
(45) Date of Patent: Feb. 18, 2025

(54) SUSPENDED PAYLOAD FOR PARABOLIC FLIGHT

(71) Applicant: Star Harbor Fly, LLC, Lakewood, CO (US)

(72) Inventors: Robert S. Ward, Lakewood, CO (US); Shubham Garg, Sarita Vihar (IN)

(73) Assignee: STAR HARBOR FLY, LLC, Lakewood, CO (US)

( * ) Notice: Subject to any disclaimer, the term of this patent is extended or adjusted under 35 U.S.C. 154(b) by 412 days.

(21) Appl. No.: 17/856,809

(22) Filed: Jul. 1, 2022

(65) Prior Publication Data
US 2023/0002051 A1   Jan. 5, 2023

Related U.S. Application Data

(60) Provisional application No. 63/218,084, filed on Jul. 2, 2021.

(51) Int. Cl.
*B64D 9/00* (2006.01)
*B64G 7/00* (2006.01)

(52) U.S. Cl.
CPC ............. *B64G 7/00* (2013.01); *B64D 9/003* (2013.01)

(58) Field of Classification Search
CPC ................................ B64D 9/003; B64G 7/00
See application file for complete search history.

(56) References Cited

U.S. PATENT DOCUMENTS

| 5,379,657 | A |   | 1/1995  | Hasselman et al. |
|-----------|---|---|---------|-----------------|
| 5,585,707 | A | * | 12/1996 | Thompson ........... B25J 5/00 405/188 |
| 6,196,514 | B1 |   | 3/2001  | Kienholz |
| 6,371,434 | B1 |   | 4/2002  | Becker et al. |
| 6,743,019 | B2 |   | 6/2004  | Ransom et al. |
| 9,194,977 | B1 | * | 11/2015 | Dungan ................ B66C 13/06 |

(Continued)

FOREIGN PATENT DOCUMENTS

| CN | 104477420 A | 4/2015 |
| CN | 108444671 A | 8/2018 |

(Continued)

OTHER PUBLICATIONS

Liu, W. et al., "Flight Test Results of the Microgravity Active Vibration Isolation System in China's Tianzhou-1 Mission" (2018) Microgravity Science and Technology 30:995-1009.

*Primary Examiner* — Jonathan M Dunlap

(74) *Attorney, Agent, or Firm* — Brownstein Hyatt Farber Schreck, LLP

(57) ABSTRACT

A payload suspension system is described herein. A payload suspension system may comprise a suspended payload container within an internal cavity defined by the payload suspension system. The suspended payload container may be suspended by one or more tensile members. The one or more tensile members may be coupled with respective tension adjustment mechanisms configured to adjust a tension of the tensile members. The tension may be adjusted based on a transition to and from a low- or micro-gravity state, in order to provide an increased or decreased movement/rotational ability for the payload container. The low- or micro-gravity state may be produced due to an aircraft performing a parabolic maneuver.

20 Claims, 19 Drawing Sheets

(56) References Cited

U.S. PATENT DOCUMENTS

| | | | | |
|---|---|---|---|---|
| 2008/0078875 | A1* | 4/2008 | Diamandis | B64G 7/00 |
| | | | | 244/1 R |
| 2013/0253751 | A1* | 9/2013 | Choi | B25J 11/00 |
| | | | | 701/23 |
| 2014/0260622 | A1* | 9/2014 | Ladner | G01F 15/007 |
| | | | | 73/579 |
| 2018/0134420 | A1* | 5/2018 | Kwon | B64G 7/00 |

FOREIGN PATENT DOCUMENTS

| | | | | | |
|---|---|---|---|---|---|
| CN | 108725851 | A | | 11/2018 | |
| CN | 208134653 | U | | 11/2018 | |
| JP | H0311000 | A | | 1/1991 | |
| KR | 20200068264 | A | * | 6/2020 | B64D 47/00 |

* cited by examiner

SUSPENDED PAYLOAD FOR PARABOLIC FLIGHT

CROSS-REFERENCE TO RELATED APPLICATION

This application is a nonprovisional and claims the benefit under 35 U.S.C. 119(e) of U.S. Provisional Patent Application No. 63/218,084, filed Jul. 2, 2021, the contents of which are incorporated herein by reference as if fully disclosed herein.

FIELD

The provided description generally relates to containment structures for a payload during parabolic flight. More particularly, the present embodiments relate to payload suspension systems for improving the quality of a low- or micro-gravity environment during parabolic flight maneuvers.

BACKGROUND

Advanced technological research in fields like biology, physics, aerospace, and medicine can benefit from experimentation in low- or micro-gravity environments. For example, low- or micro-gravity environments may be used to advance research in a number of fields in preparation for space travel or exploration of other planets. As another example, certain materials, including organic materials, may grow differently in low- or micro-gravity and may be used to produce structures that are either impossible or difficult to produce terrestrially.

In order to create the conditions for a low- or micro-gravity environment, space environments, like the International Space Station (ISS), have been created by suspending a craft in orbit around the Earth. Researchers may travel to these space stations or celestial bodies to conduct experiments that could not otherwise be performed terrestrially. However, the cost and risk associated with traveling to various space stations or celestial bodies is high. Additionally, there may be a limited space for experiments performed on a space station or spacecraft, which may restrict the size and number of experiments that can be conducted.

The techniques described herein are directed to techniques for simulating a low, zero, or near zero (low- or micro-gravity) conditions using a suspended payload that can be used in a variety of scenarios.

SUMMARY

This summary is provided to introduce a selection of concepts in simplified form that are further described herein. This summary is not intended to identify key features or essential features of the claimed subject matter, nor is it intended to be used as an aid in determining the scope of the claimed subject matter.

In some embodiments of the provided disclosure, a payload suspension system for affecting a quality of a low- or micro-gravity environment of a payload in an aircraft may be provided. The payload suspension system may comprise a frame defining an internal cavity, a payload container positioned within the internal cavity and configured to hold a payload, a set of tensile members suspending the payload container within the internal cavity, each tensile member of the set of tensile members coupled to a respective corner of the payload container, a set of tension adjustment mechanisms, each tension adjustment mechanism of the set of tension adjustment mechanisms coupled to a tensile member of the set of tensile members and configured to apply a tension to the tensile member, at least one sensor configured to monitor a gravitational or inertial condition of the aircraft, and a controller. The controller may be configured to, using gravitational conditions detected by one or more sensors, detect a transition from a non-microgravity state to a low- or micro-gravity state and, in response to detecting the transition from the non-microgravity state to the low- or micro-gravity state, cause at least one tension adjustment mechanism of the set of tension adjustment mechanisms to vary a tension of at least one tensile member of the set of tensile members.

In response to the detection of the transition to the low- or micro-gravity state, the controller may be configured to cause the set of tension adjustment mechanisms to loosen at least one tensile member of the set of tensile members. The controller may be further configured to, in response to a second detection of a second transition from the low- or micro-gravity state to the non-microgravity state, control the set of tension adjustment mechanisms to tighten at least one tensile member of the set of tensile members.

The payload suspension system may further comprise a set of pulleys and each tensile member of the set of tensile members may be at least partially wrapped around a respective pulley of the set of pulleys.

The payload container may comprise an angled deck, the angled deck defining a second internal cavity separated from the payload container by a wall. The payload suspension system may further comprise a power supply, the power supply provided within the angled deck and communicatively coupled to the set of tension adjustment mechanisms.

The payload container may be a rectangular-cuboid and each tensile member of the set of tensile members may be coupled to a respective corner of the rectangular-cuboid. The at least one sensor may be at least one of a gravimeter, an altimeter, or an accelerometer.

In some embodiments, a method of improving a low- or micro-gravity quality of a payload container during a parabolic flight maneuver of an aircraft may be provided. The method may comprise, using a sensor, monitoring at least one of an acceleration or a gravitational force with respect to an aircraft, using an output from the sensor, detect a transition from a non-microgravity state to a low- or micro-gravity state, and, in response to detecting the transition, causing a set of tension adjustment mechanisms to reduce a tension of a set of tensile members coupled to the payload container thereby increasing a movement ability of the payload container.

The method may further comprise, after detecting the transition, continuing to monitor at least one of the acceleration or the gravitational force, detecting a second transition from the low- or micro-gravity state to the non-microgravity state, and in response to detecting the second transition, causing a set of tension adjustment mechanisms to increase the tension of the set of tensile members coupled to the payload container thereby decreasing the movement ability of the payload container.

A free length of a respective tensile member of the set of tensile members may be controlled by a respective tension adjustment mechanism of a set of tension adjustment mechanisms. The sensor may be an accelerometer or a gravimeter. The set of tension adjustment mechanisms may be controlled in response to a threshold change in the output of the accelerometer or the gravimeter. Each tensile member of the set of tensile members may be coupled to a respective corner of the payload container.

The payload container may be isolated from external acceleration-related stresses or disturbances generated by the aircraft, the external acceleration-related stresses or disturbances including at least one of a turbulence or an engine operation.

The aircraft may be isolated from internal acceleration-related stresses or disturbances of the payload container, the internal acceleration-related stresses or disturbances including acceleration-related stresses or disturbances generated by a payload.

According to some embodiments, a payload suspension system for improving a quality of a low- or micro-gravity environment of a payload may be provided. The payload suspension system may comprise a frame defining an internal cavity, a payload container positioned within the internal cavity and configured to hold a payload, and a set of tensile members, each tensile member of the set of tensile members coupling a respective corner of the payload container to the frame thereby suspending the payload container within the internal cavity.

Each tensile member of the set of tensile members may be under tension thereby impeding motion of the payload container within the internal cavity of the frame. At least two tensile members of the set of tensile members may not be under tension during a non-microgravity flight condition. All of the tensile members of the set of tensile members may not be under tension during a low- or micro-gravity flight condition.

BRIEF DESCRIPTION OF THE DRAWINGS

Reference will now be made to representative embodiments illustrated in the accompanying figures. It should be understood that the following descriptions are not intended to limit the embodiments to one or more preferred embodiments. To the contrary, they are intended to cover alternatives, modifications, and equivalents as may be included within the spirit and scope of the described embodiments as defined by the appended claims. Similar reference numerals have been used, where practicable, to designate similar features.

Figure 1A:
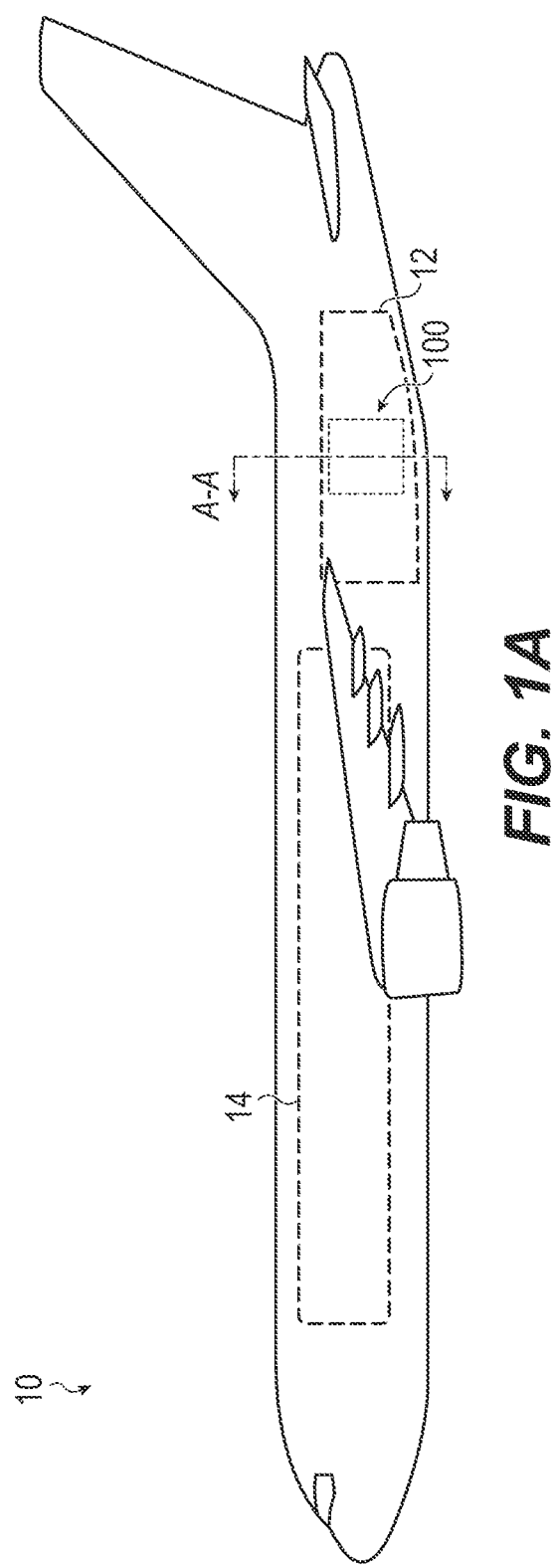
FIGS. 1A-1D illustrate an example aircraft for performing parabolic flight maneuvers and a payload suspension system provided therein, the example payload suspension system including a suspended payload container for isolating a payload, as described herein.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The provided disclosure relates to payload suspension systems and, more specifically, to apparatuses and methods for improving a quality of a low- or micro-gravity environment with respect to a payload during a parabolic flight maneuver. A payload suspension system, as provided, comprises a number of features that will become apparent with reference to the appended figures and associated description.

The techniques described herein are directed to techniques for simulating a low, zero, or near zero (low- or micro-gravity) conditions using a suspended payload that can be used in a variety of scenarios. The suspended payload may be positioned within a cargo hold of a terrestrial aircraft that performs a parabolic flight maneuver. Normal aircraft operations may produce acceleration-related stresses and disturbances that may degrade a low- or micro-gravity environment experienced by the payload. The systems and techniques described herein may be used to reduce acceleration-related stresses and disturbances and other movements that may affect a low- or micro-gravity environment.

Generally, parabolic flight maneuvers may be performed by an aircraft to simulate a micro-gravity or a low-gravity environment. As described herein, the low- or micro-gravity environment created during a parabolic flight may be referred to as a low- or micro-gravity condition or state and typically corresponds to a gravity condition in which the contents of the aircraft (passengers and cargo) experience less than 1 g (e.g., less than the acceleration due to Earth's gravitational field) or less.

As the term is used herein, low-gravity environments may be used to refer to a gravitational condition, as produced during a particular parabolic flight maneuver, of less than 1 g. In some implementations, low-gravity environments may refer to environments associated with gravitational conditions of less than 0.9 g and/or gravitational conditions of less than 0.5 g. Low-gravity environments may approximate gravitational forces on celestial bodies, including celestial bodies within the Solar System. As the term is used herein, a micro-gravity environment may be used to refer to a gravitational condition, as produced during a particular parabolic flight maneuver, of less than 0.1 g. In some implementations, micro-gravity environments may refer to environments associated with gravitational conditions of less than 0.05 g and/or of approximately 0.01 g. In some cases, micro-gravity environments may approximate gravitational forces as experienced in space. It is noted that, as the term is used herein, micro-gravity environments be a form of low-gravity environments and the phrase "micro-gravity or low-gravity environment," as used herein, may refer to low-gravity environments, some environments of which may be micro-gravity environments. As used herein, a micro-gravity condition or environment may correspond to a gravity range of less than $10^{-2}$ g. In some cases, the micro-gravity condition or environment may correspond to a gravity range of less than $10^{-5}$ g. In some cases, the a micro-gravity condition or environment may correspond to a gravity range of less than $10^{-6}$ g. In some cases, a micro-gravity condition or environment may also be referred to as a simulated zero-gravity condition or environment.

Low- or micro-gravity conditions created during parabolic flight maneuvers can be used to simulate conditions in space or celestial bodies in order to provide a low- or micro-gravity experience for the passengers or for scientific experiments conducted on the aircraft. For example, a gravitational value of approximately 0.38 g may correspond to Martian gravity, a gravitational value of approximately 0.16 g may correspond to a Lunar gravity, and a gravitational value of approximately 0 g (e.g., approximately 0.01 g) may correspond to gravity in space. In some cases, negative gravitational values may be produced during parabolic flight.

In some cases, the payload suspension systems described herein can be used for flight maneuvers that are performed at different altitudes. For example, the payload suspensions system can be used for parabolic flight maneuvers performed at common flight altitudes that would include altitudes approximately ranging from 20,000 feet to 40,000 feet. In other cases, the payload suspension system described herein can be used for flight maneuvers performed at suborbital flights, for example, flights that include altitudes of approximately 300,000 feet or greater. Additionally or alternatively, the payload suspension system described herein can be used for suborbital, orbital or deep space flights, for example, a parabolic flight occurring at the moon or other planet. In some cases, the payload suspension system described herein can be used in orbital space craft to remove impulses, or other sudden movements, which could include movements to avoid space debris.

During a parabolic flight maneuver, due to normal operation of an aircraft, acceleration-related stresses and disturbances may be generated, which may transmit through the aircraft fuselage and may be transmitted to the cargo hold and/or passenger cabin. These acceleration-related stresses and disturbances may disrupt or degrade the low- or micro-gravity condition, which may impact the experience of the passengers or affect low- or micro-gravity experiments being conducted on the airplane. In some cases, the acceleration-related stresses and disturbances may resonate or otherwise compound due to cargo or other payloads that are structurally coupled to the fuselage or other structural component of the aircraft. The systems and techniques described herein may be used to reduce the acceleration-related stresses and disturbances experienced by a payload (which may contain an experiment), or as experienced by passengers or equipment positioned in a cabin of an aircraft, and to enhance a quality of a low- or micro-gravity profile as experienced by passengers or equipment.

Embodiments described herein generally reference payload suspension systems. An example payload suspension system may include a suspended payload container suspended within an internal cavity defined by a frame of the payload suspension system. The suspended payload may be suspended by a set of tensile members which may, in some cases, be affixed to each corner of the suspended payload container on one end and may be affixed to the frame on the other end. The payload suspension system may isolate the suspended payload container such that acceleration-related stresses and disturbances produced during a parabolic flight maneuver, such as acceleration-related stresses and disturbances caused by aircraft engines and/or turbulence, do not affect, or reduce, a low- or micro-gravity quality experienced by the suspended payload container. Additionally, acceleration-related stresses and disturbances produced by the suspended payload container (e.g., during experimentation) may be isolated from external acceleration-related stresses and disturbances. Other aspects of the provided disclosure are additionally provided herein.

A payload suspension system may, as discussed above, include a set of tensile members, which may be formed from a cable, rope, wire, high tensile strength string, or other similar structural element. During a payload installation process, each tensile member of the set of tensile members may be adjusted to provide a particular length that allows the payload container to be suspended within a frame or other structure. For example, in some cases, the tension or slack in each tensile member is adjusted such that each tensile member both supports a payload weight and provides minimal, or no, sway or rotation allowance for the payload container. The tension in each tensile member may also prevent the payload container from contacting or impacting the surrounding frame or other structural elements.

In some implementations, the payload container may be secured where some of the tensile members have a certain degree of slack or play. While the payload container may be suspended, the slack or play in some of the tensile members allows the payload container to float during a low- or micro-gravity condition created by the parabolic maneuver. For example, when an aircraft is flying under gravitational conditions at or around 1 g, the top tensile members may be taut, to suspend the payload container, while the bottom tensile members are loose. During a parabolic maneuver (e.g., less than 1 g conditions), the payload may "float" such that all tensile members have some degree of slack. As described herein, a transition between gravitational states within the aircraft may be detected using an on-board sensing system that can sense transitions in the flight conditions of a parabolic flight maneuver.

In some implementations, a set of tension adjustment mechanisms may be provided to actively adjust or vary the tension in one or more tensile members depending on sensed conditions of the flight. For example, a tension adjustment mechanism may be coupled to a tensile member and may be used to apply tension to the tensile member during normal or greater than 1 g conditions and may reduce or remove tension applied the tensile member during low- or micro-gravity conditions. A tension adjustment mechanism may be provided for each tensile member such that each tensile member is individually controllable. In some cases, only some tensile members are provided with a respective tension adjustment mechanism. As described herein, a tension adjustment mechanism may include a movable pulley, a motor-driven spool, a linear cylinder, an eccentric cam, or other types of mechanism.

In some cases, the tension adjustment mechanisms are communicatively coupled to a controller that is adapted to control the tension adjustment mechanisms in accordance with one or more sensors of a sensing system that monitor flight conditions or a gravitational state of a payload or payload suspension system. For example, an accelerometer may be used to detect an acceleration value of an aircraft on which the payload suspension system is provided. The accelerometer may be able to detect transitions or a state of the aircraft performing a parabolic maneuver, and the output from the accelerometer may be used to control tension in one or more of the tensile members. The sensors may detect either a transition into (or out of) a low- or micro-gravity condition or may be used to detect a sustained low- or micro-gravity condition.

The sensing system may include one or more of a variety of sensors including, for example, an accelerometer, which may be adapted to detect changes in accelerations or forces acting on the system. The sensing system may include a gravimeter that may be used to detect a gravitational force (e.g., a g-force) and may monitor a gravitational condition on an aircraft during a parabolic maneuver. In some cases, an altimeter is used to detect an altitude of an aircraft, where an altitude may correspond to what state an aircraft is in during a parabolic maneuver. Any number, and type, of sensor(s) may be used including gyroscopes, microelectromechanical system (MEMS) inertial sensors, or other types of sensors that are able to detect changes in acceleration, gravity, or inertial condition.

The payload suspension system described herein can be utilized for a variety of different types of experiments. For example, the payload suspension system can be used for physical science experiments, including but not limited to, physics/motion (e.g., particle physics, aggregation, plasma physics, etc.), materials sciences (e.g., polymer properties, processes and/or microstructures), fluid and combustion physics, chemistry, dynamic systems, and so on. In other examples, the payload suspension system can be used for technology experiments and life science research (e.g., human research, biology, and so on) or any other suitable types of experiments that can be conducted within the payload containers described herein.

Additional details of a payload suspension system are provided herein. Through the use of such a payload suspension system, a quality of a low- or micro-gravity condition, with respect to a payload, may be improved. In some implementations, the suspended payload system may prevent acceleration-related stresses and disturbances produced within the payload from affecting flight of the aircraft itself. Furthermore, the suspended payload system may isolate the payload from a passenger area and/or from other containers as may be provided in a cargo bay. As discussed herein, the payload suspension systems may have any number of shapes and may be formed from any number of materials. A suspended payload container may be provided within any number of frames in accordance with aspects of the provided disclosure.

These and other embodiments are discussed below with reference to FIGS. 1A-9. However, those skilled in the art will readily appreciate that the detailed description given herein with respect to these figures is for explanatory purposes only and should not be construed as limiting.

FIGS. 1A-1D illustrate an example aircraft 10 for performing parabolic flight maneuvers and an example payload suspension system 100 provided therein. The payload suspension system 100 depicted in FIGS. 1A-1D is merely one example of an aircraft and payload suspension system and any shaped and/or sized container may be used in accordance with the provided disclosure.

Figure 1B:
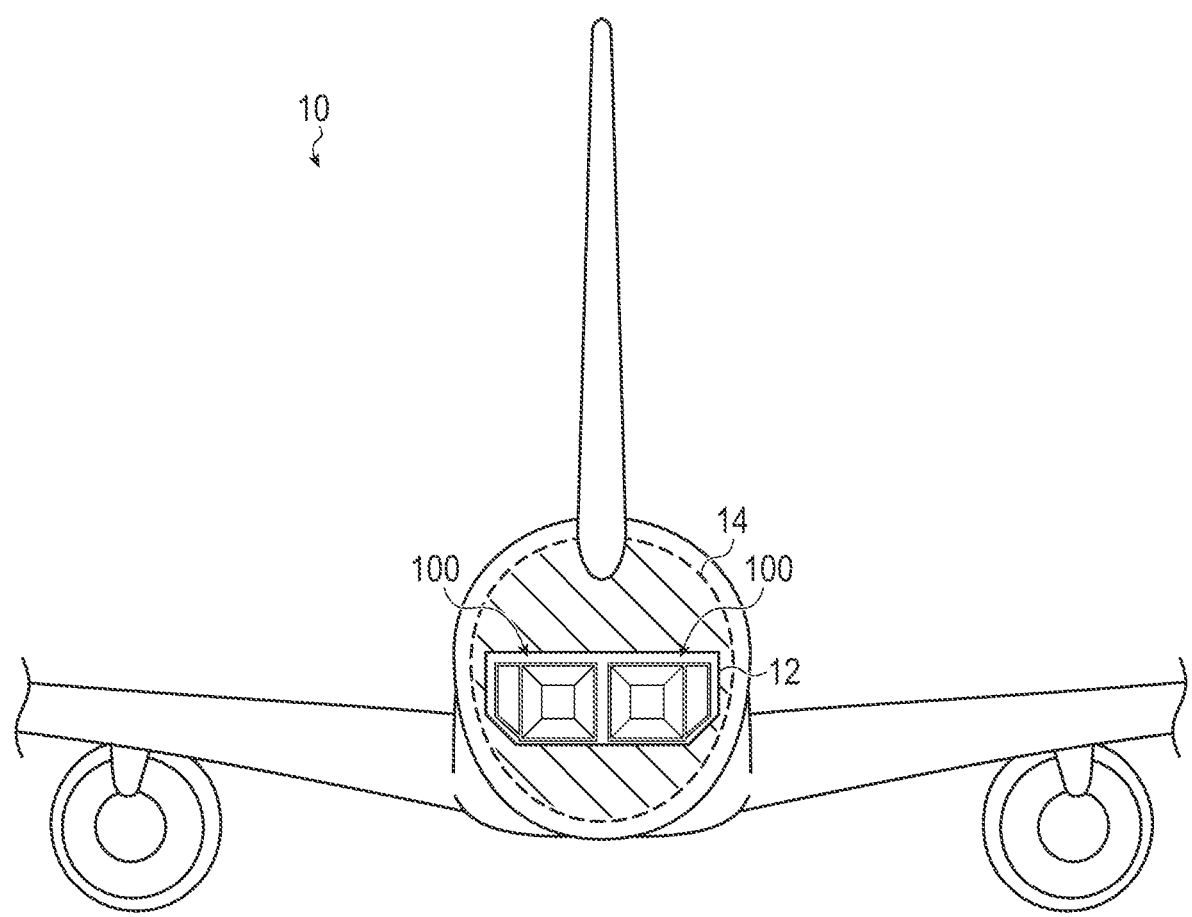

FIGS. 1A-1B depict an example aircraft 10 and an example payload suspension system 100 suspended within a cargo hold 12 of the aircraft 10. Though the payload suspension system 100 is depicted within a cargo hold 12, it is appreciated that the payload suspension system 100 may be provided within any area of the aircraft 10.

In accordance with aspects of the provided disclosure, an aircraft 10 may be adapted to perform parabolic flight maneuvers. A parabolic flight maneuver (discussed in further detail with respect to FIG. 2) includes the rapid rise and fall of the aircraft 10. Due to physical principles, parabolic flight maneuvers may result in changing g-forces as experienced within the aircraft 10. For example, while the aircraft 10 is quickly ascending or descending in altitude, a perceived gravitational force may increase. Likewise, at the top of a parabolic flight maneuver, a perceived gravitational force may decrease. This may result in people or objects experiencing periods of full- or partial-weightlessness or periods where people or objects experience heavier-than-normal weights.

Parabolic flight maneuvers may be performed for entertainment and/or research purposes. For example, passengers on the aircraft 10 performing a parabolic flight maneuver may experience full or partial weightlessness at certain points during a parabolic flight (e.g., a low- or micro-gravity condition) and may enjoy moving around a cabin area 14 of the aircraft 10 under altered gravitational perceptions. Additionally, research materials may be stored in a cabin area 14 or cargo hold 12 of the aircraft 10 to perform experiments during low-, micro- or high-gravity conditions.

However, certain acceleration-related stresses and disturbances, such as stresses and disturbances caused by aircraft engines or turbulence, may degrade a low- or micro-gravity condition. For example, passengers in a cabin area 14 may be jostled by acceleration-related turbulences or engine functions even when a low- or micro-gravity condition is present. In some cases, a payload may be jostled by the acceleration-related stresses and disturbances and a quality of the experiment may be degraded. Yet further, acceleration-related stresses and disturbances generated from a payload may travel through an aircraft 10 (e.g., a fuselage of the aircraft 10) and may degrade a low- or micro-gravity quality of the cabin area 14.

As depicted in FIGS. 1A-1B, a payload suspension system 100 may be provided within a cargo area 12. The payload suspension system 100 may include an isolated payload container (e.g., payload container 108 as depicted in FIG. 1D) which may isolate the payload container 108 and an associated payload from external acceleration-related stresses and disturbances. As such, acceleration-related stresses and disturbances caused by, for example, engine functions or turbulence may be prevented from traveling to the payload container 108 due to the isolated structure of the payload container. Yet further, acceleration-related stresses and disturbances produced from a payload within a payload container 108 may be prevented from affecting a low- or micro-gravity quality of a cabin area 14, which may increase a low- or micro-gravity quality with respect to passengers aboard the aircraft 10.

The aircraft 10 may be any aircraft and may, in some cases, be a BOEING 767 aircraft, though any aircraft may be used in accordance with the provided disclosure. The aircraft 10 may have any number of internal spaces, including a cockpit, a cabin area 14, a cargo hold 12, an engine area, and other regions defined by the structure of the aircraft. The cabin area 14 may be used to transport passengers and may be outfitted for the passengers to safely experience low- or micro-gravity conditions. The cargo hold 12 may be configured to hold any number of payload containers and/or payloads. A payload suspension system 100, as described herein, may be positioned within the cargo hold 12.

As discussed above, a payload and/or payload container of the payload suspension system 100 may be suspended, thereby reducing or eliminating acceleration-related stresses and disturbances, such as stresses or disturbances generated from equipment (e.g., an engine) of the aircraft 10. In addition, acceleration-related stresses and disturbances produced by the suspended payload and/or payload container may be isolated from a cabin area 14 and may result in the passengers experiencing a higher quality low- or micro-gravity environment.

FIG. 1B depicts a cross-sectional view of an aircraft 10 across line A-A as depicted in FIG. 1A. As shown in FIG. 1B, a cargo hold 12 may be provided near the base of an aircraft 10 and a payload suspension system 100 may be positioned within the cargo hold 12. As depicted in FIG. 1B, the payload suspension system 100 may be provided on a floor of the cargo hold 12. As the payload suspension system 100 is in contact with the cargo hold 12, acceleration-related stresses and disturbances from the cargo hold 12 may be easily transmitted to an external frame of the payload suspension system 100. As will be made apparent with respect to FIGS. 1C-1D, a suspended payload container may be isolated from the acceleration-related stresses and disturbances that would otherwise be transmitted directly to the payload. Yet further, acceleration-related stresses and disturbances from the cargo hold 12 (e.g., acceleration-related stresses and disturbances generated from a payload) may be transmitted to the cabin area 14 under normal circumstances. However, as the payload suspension system 100 comprises an isolated payload container, such acceleration-related stresses and disturbances may be contained within the payload suspension system 100.

Figure 1C:
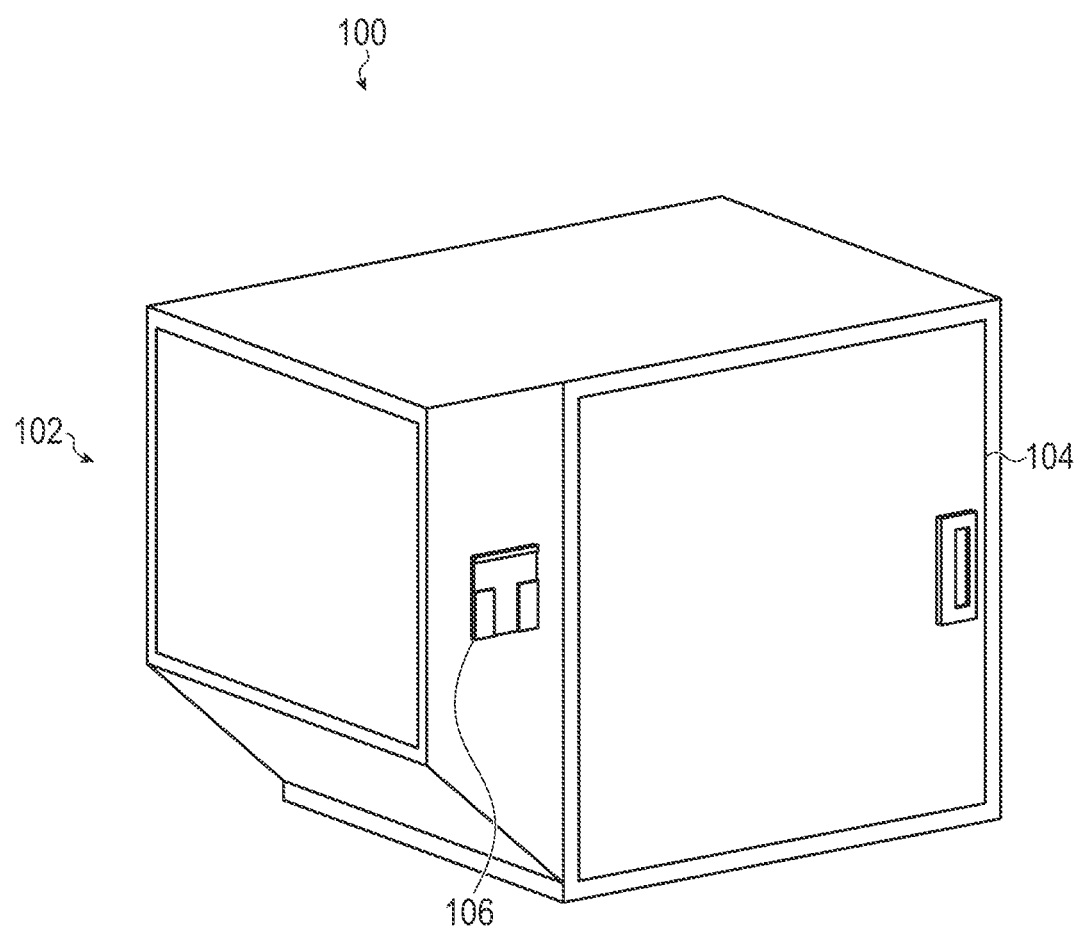
Figure 1D:
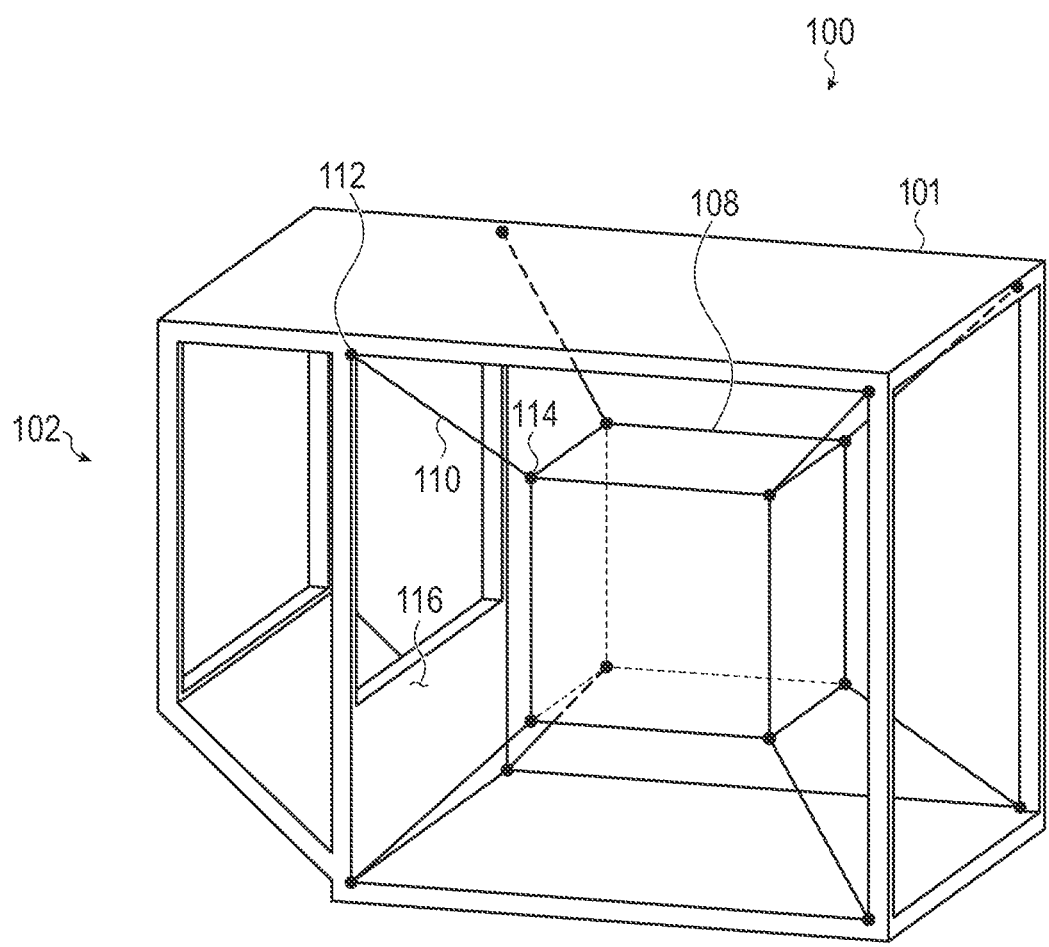

FIGS. 1C-1D depict a payload suspension system 100. As described herein, the payload suspension system 100 may be used to isolate a payload from acceleration-related stresses and disturbances as produced during a parabolic flight maneuver. For example, as depicted in FIG. 1D, a payload container 108 may be suspended from a set of tensile members 110 so that acceleration-related stresses and disturbances on the payload container 108 are reduced or eliminated.

As shown in FIG. 1C, the payload suspension system 100 may comprise a box portion and an angled deck 102. The angled deck 102 may have an inclined floor and may, in some cases, hold equipment, such as a power and battery system, for a payload and/or the payload suspension system 100. The payload suspension system 100 may further include a door 104. The door 104 may be a hinged door with a handle and latching mechanism, as depicted in FIG. 1C. In some cases, the door 104 is replaced by a canvas covering and/or a set of straps to prevent items from escaping an internal cavity. A payload suspension system 100 may additionally include a handle 106 for accessing an internal cavity of the angled deck 102. The handle 106 may, when used, open and/or close an associated door.

The payload suspension system 100 may conform to certain unit load device (ULD) specifications. For example, the payload suspension system 100 may conform to an LD-3 ULD container, a Demi ULD container, an M-1 ULD container, and so on. The exact shape and/or dimensions of the payload suspension system 100, as depicted in FIGS. 1A-1D, are not limited to any single embodiment and any container, either retrofit or intentionally manufactured, may be used in accordance with the provided disclosure.

FIG. 1D depicts an internal view of the payload suspension system 100 of FIG. 1C (e.g., with certain components or covers removed to display an internal cavity). As depicted in FIG. 1D, a payload container 108 may be suspended from a frame 101 of the payload suspension system 100. The frame 101 may be formed from welded steel or aluminum tubes that are coupled to define a substantially rigid structure. In some cases, the members or elements of the frame 101 are fastened together using traditional fasteners like threaded fasteners, rivets or other similar fastening elements. A set of tensile members 110 may be affixed to points within an internal cavity of the frame 101, at one end 112, and may be affixed to corners of the payload container, at an opposite end 114. This arrangement allows the payload container 108 to be suspended within the internal cavity of the payload suspension system 100.

The tensile members 110 may be formed from any material capable of supporting a weight of the payload container 108. The tensile members can be made from various materials including metal, polymers, textiles, composites, and so on. The tensile members 110 may be formed from a material that may be classified as a high-tensile strength material that has a tensile strength of 1500 pounds or greater, though any tensile strength may be used in accordance with the provided disclosure. The construction of the tensile members may include woven materials, wound materials, braided materials, wires, or other similar constructions. The tensile members 110 may be wound around an internal structure of the frame 101 or may be otherwise affixed to a frame 101 of the payload suspension system 100 at one end 112 and may be wound about a structure of the payload container 108 or otherwise affixed to the payload container 108 at another end 114. In some cases, the tensile members 110 may be wound around a protrusion and/or depression of the frame 101 or the payload container 108 at each end 112/114.

As depicted in FIG. 1D, a wall 116 may separate an internal cavity containing the payload container 108 from an internal cavity of the angled deck 102. The wall 116 may only extend partway from a frame 101 of the payload suspension system 100 so that a window between the internal cavity container 108 and the internal cavity of the angled deck 102 is formed. As discussed below, this window may permit an object to extend between both internal cavities. The internal cavity of the angled deck 102 may comprise a number of shelves.

The payload container 108 may be formed as a cube, as depicted in FIG. 1D, or may have any other shape and/or side, so long as the payload container 108 is suspended by one or more tensile members 110. The payload container 108 may include an additional internal cavity so that a payload may be placed within the payload container 108. According to some implementations of the payload suspension system 100, a combined weight of a payload placed within the payload container 108 and the payload container 108 itself may be between 50 and 100 pounds, though any other weight, such as from between 10-25 pounds, below 50 pounds, or above 100 pounds, may be used as a combined weight of the payload and the payload container 108.

The payload container 108 may be formed from a frame or enclosure that defines an internal volume. The payload container 108 may be formed, for example, from a sheet metal structure that surrounds or encloses an internal volume. The payload container may also be formed from other materials including, without limitation, polymers, compressed fiber product, composites, or any combination thereof. The internal volume may include space for the payload, which may be an experiment or material that is to be subjected to the low- or micro-gravity conditions.

The internal cavity of the payload container 108 may be cushioned to protect the payload from striking a hard object. A number of straps or other securement mechanisms may additionally be provided to secure the payload within the payload container. A door may additionally be provided on the payload container 108, may, when opened, permit a payload to be placed within the payload container 108, and may, when closed, act to secure the payload.

Figure 2:
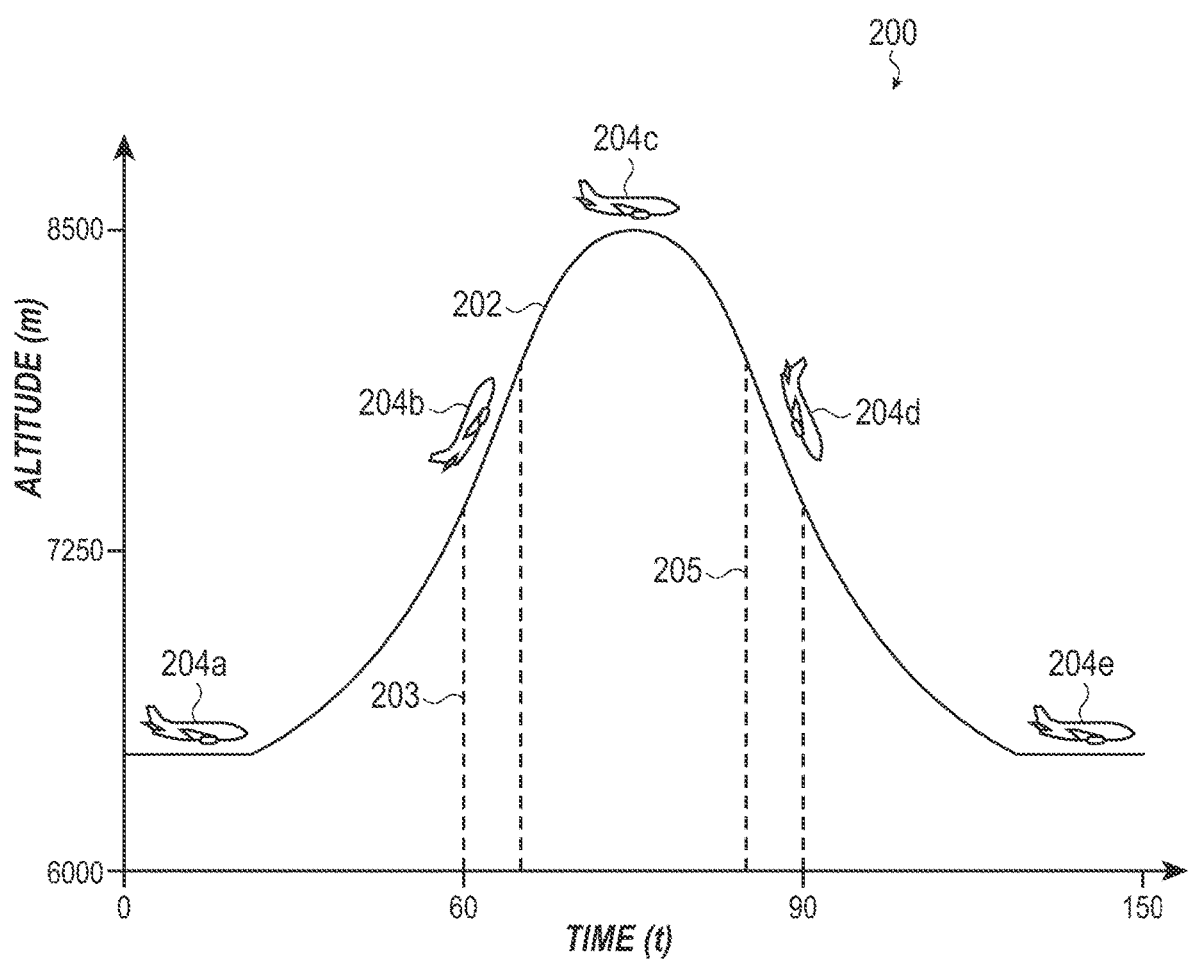
FIG. 2 depicts an example representation of a parabolic flight maneuver including transitional states into and out of a low- or micro-gravity state, as described herein.

FIG. 2 illustrates an example representation of a parabolic flight maneuver 200. As described above, an aircraft may perform a parabolic flight maneuver in order to provide a low- or micro-gravity environment. As depicted in FIG. 2, the representation of the parabolic flight maneuver 200 is depicted as a relationship between an altitude (in meters) and a time (in seconds). The provided values for altitude and time are provided merely for explanatory purposes and a parabolic maneuver may be performed over any time period and/or altitude range possible for parabolic flights. Though only one parabolic maneuver is depicted in FIG. 2, during a single flight, any number of parabolic maneuvers may be performed successively. Parabola 202 represents a flight of an aircraft performing a parabolic maneuver.

At state 204a, an aircraft may be flying under gravitational conditions at or above 1 g (e.g., standard gravity or hyper-gravity). The state 204a may occur at any altitude and at any speed (e.g., an altitude of 6,500 meters (m) and a speed of 250 meters/second (m/s)). At state 204a, a velocity may be increased in order for the aircraft to generate the required speed and/or energy to perform the parabolic maneuver. A time period in which the aircraft is in the state 204a may be any time period as determined by a pilot of the aircraft or an associated flight plan.

At state 204b, an aircraft may begin to gain altitude and enter a portion of the maneuver in which the pitch of the aircraft is increasing. An angle of the aircraft as it gains altitude may be any angle necessary to perform a parabolic maneuver and may depend based on a desired value of a low- or micro-gravitational condition. In one example the angle of the aircraft ranges between 35 and 55 degree. An example angle may be approximately 50 degrees. Another example angle is 42 degrees, which may be used to simulate gravitational conditions corresponding to lunar gravity. A speed of the aircraft during the state 204b may be reduced (e.g., to 170 m/s to 200 m/s). During state 204b, the aircraft may experience a hyper-gravity environment (e.g., 1.8 g). Due to the hyper-gravity environment, movement on the aircraft may be more difficult and an object may seem heavier. In this way, a downward force may be increased. A time in which the aircraft is in the state 204b is not particularly limited and may, in some cases, last around 30 seconds.

As depicted in FIG. 2, the state 204b may end or include a (first) transitional period 203. The transitional period 203 may be sensed or detected using the sensing system and used to control the suspension system, described herein. During the injection transitional period 203, a power thrust of the aircraft may be reduced, a pitch may be changed, and/or a gravitational state may transition from at or above 1 g to a low- or micro-gravity state. The transitional period 203 may be characterized by the aircraft transitioning from a increasing pitch condition to a decreasing pitch condition. This transitional period 203 may last for a predefined time period, as determined by the pilot or flight control. In some cases, the transitional period 203 lasts from 5-20 seconds. In some cases, the transitional period 203 lasts approximately 10 seconds. As the aircraft transitions to the low- or micro-gravity state, depending on aspects of the parabolic flight, the gravitational forces may steadily change from standard gravity or hyper-gravity conditions to low- or micro-gravity conditions. At the end of the injection transitional period 203, a temporary low- or micro-gravity state may be achieved with respect to the aircraft.

At state 204c, the aircraft traverses through of the parabola 202 portion of the flight maneuver and a low- or micro-gravity environment may be created within the aircraft. During state 204c (e.g., a low- or micro-gravity state 204c), a speed of the aircraft may be reduced (e.g., to 90 m/s-120 m/s) and the aircraft may experience a reduced net gravitational force. Any passengers within the aircraft may experience weightlessness or near weightlessness depending on the low- or micro-gravity state generated. A degree of low- or micro-gravity may depend on a speed and/or a pitch of the aircraft. In a non-limiting example, an initial pitch of 47 degrees may result in the perception of low- or micro-gravity (e.g., less than 0.1 g), an initial pitch of 42 degrees may result in the perception of Lunar gravity (e.g., 0.16 g), and an initial pitch of 38 degrees may result in the perception of Martian gravity (e.g., 0.38 g). A time of perceived low- or micro-gravity conditions may be around 10-40 seconds. The length of time of the parabolic portion of the flight depends on the particular flight path, altitude, and properties of the aircraft and may vary depending on the implementation.

At state 204d, an aircraft may begin to lose altitude as the aircraft ends the parabolic portion of the maneuver. A pitch decrease may be any angle necessary during a parabolic maneuver and may be equivalent to or different from a pitch of the aircraft during state 204b. A speed of the aircraft during the state 204d may be increased. During state 204d, the aircraft may simulate a hyper-gravity environment (e.g., 1.8 g). Due to the hyper-gravity environment, movement on the aircraft may be more difficult and an object may seem heavier. In this way, a downward force may be increased. A time in which the aircraft is in the state 204d is not particularly limited and may, in some cases, last around 30 seconds.

As depicted in FIG. 2, the state 204d may include a second or recovery transitional period 205. The transitional period 205 may be sensed or detected using the sensing system and used to control the suspension system, described herein. During the recovery transitional period 205, a power thrust of the aircraft may be increased and a gravitational state may transition from a low- or micro-gravity state to a gravitational state at or above 1 g. The transitional period 205 may be characterized by the aircraft transitioning from a decreasing or neutral pitch condition to an increasing pitch condition. This transitional period 205 may last for a predefined time period, as determined by the pilot or flight control. In some cases, the transitional period 205 lasts from 5-20 seconds. In some cases, the transitional period 205 lasts approximately 10 seconds. As the aircraft transitions to a standard gravity or hyper-gravity state, the gravitational forces may steadily change from low- or micro-gravity conditions to standard gravity or hyper-gravity conditions. At the end of the recovery transitional period 205, a standard gravity or hyper-gravity state may be achieved with respect to the aircraft.

After leaving the state 204d, the aircraft may return to a standard flightpath as indicated by state 204e. During the state 204e, the aircraft may resume traveling at normal altitudes and speeds. In some cases, successive parabolic maneuvers are performed by the aircraft after the state 204e. In this case, the parabolic maneuver may be designed to conserve energy or aircraft velocity in order to begin the next parabolic maneuver rapidly after the conclusion of the current parabolic maneuver. In some cases, the aircraft may continue traveling and/or may begin landing procedures.

During the parabolic maneuver, the aircraft may elevate to about 9,000 meters at a peak of the parabola (e.g., at state 204c). A difference between a height of the aircraft at a beginning/end of a parabolic maneuver and a height of the aircraft at a peak of the parabolic maneuver may be about 2,500 m, though these values are provided for explanatory purposes only and any value may be used in accordance with the provided disclosure.

FIG. 2 provides one example flight path or condition. In some cases, parabolic flight maneuvers or other low gravity flight maneuvers can be performed in other types of flight conditions such as suborbital flights, orbitals flights, and/or deep space flights. In some cases, the size of the payload suspension system and/or payload container may be adjusted based on the type of flight. For example, the size of the payload container may be decreased for suborbital, orbital or deep space flights.

Figure 3:
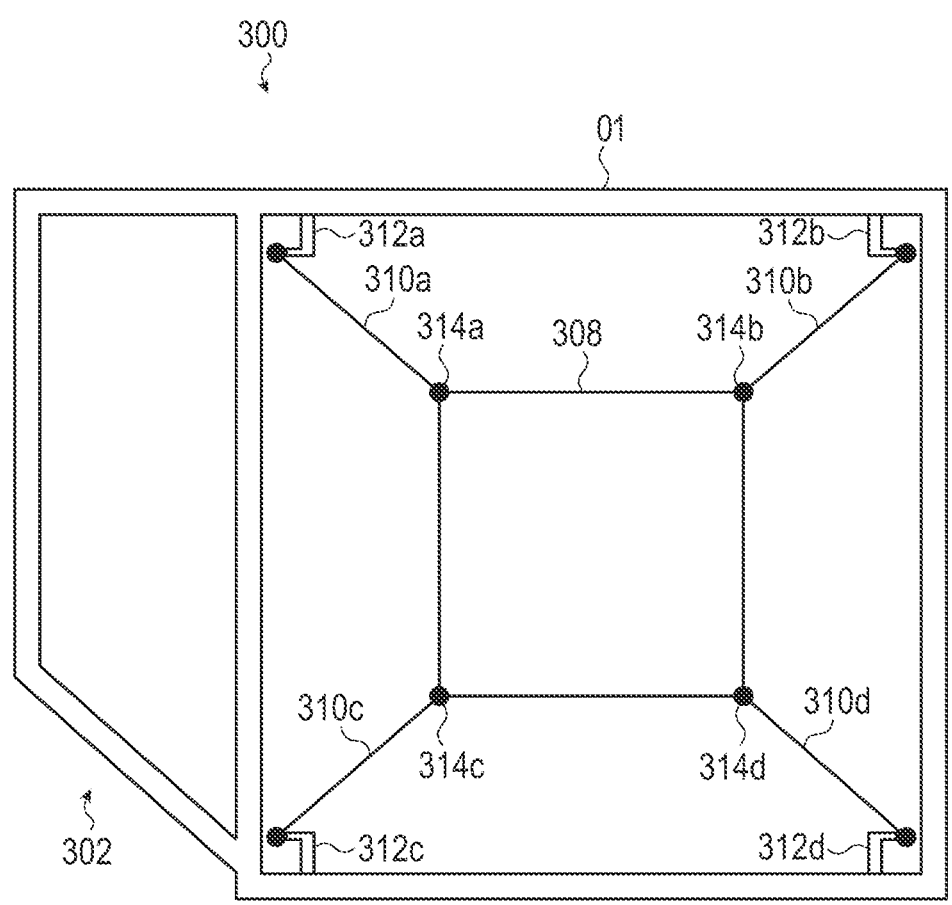
FIG. 3 depicts an example representation of a suspended payload container as suspended by taut tensile members, as described herein.

FIG. 3 depicts a graphical representation of a payload suspension system 300 with an example tension of tensile members 310a-310d. In FIG. 3, an angled deck 302 is depicted, though it is noted that the angled deck 302 may be eliminated in some embodiments. The overall shape and size of the payload suspension system 300 may additionally be different in various embodiments. FIG. 3 is represented as a two-dimensional figure, for ease of representation. However, it is noted that a payload suspension system may be three-dimensional and may include tensile members connected to each corner (e.g., 8 corners) of a cube, as depicted in FIG. 1D.

The payload suspension system 300 may define a frame 301 surrounding an internal cavity and a payload container 308 may be suspended within the internal cavity. A set of anchors 312a-312d may be positioned on an internal portion of a frame 301 of the payload suspension system 300 and may extend within the internal cavity. A set of tensile members 310a-310d may be coupled with the set of anchors 312a-312d (e.g., by being wound around a respective anchor), as depicted in FIG. 3. An opposite end of the set of tensile members 310a-310d may be coupled to the payload container 308 at respective corners 314a-314d of the payload container.

A tension may be applied to each tensile member 310a-310d such that the payload container 308 is suspended within the frame 301. The position and tension of the tensile members may prevent or impede free movement (e.g., an ability of the payload container 308 to move within the frame 301) of the payload container 308 during flight conditions. By this arrangement, the payload container 308 may have little to no sway allowance and may be resistant to movement during a parabolic maneuver, or in general flight conditions. Further, as the payload container 308 is isolated from a surrounding frame 301 of the payload suspension system 300, acceleration-related stresses and disturbances caused during flight (e.g., turbulence and/or engine disturbances) may be at least partially isolated with respect to the payload container 308. For example, the tensile members 310a-310d may isolate the payload container 308 from external acceleration-related stresses and disturbances caused by, for example, turbulence or engine disturbances. In some implementations, the tensile members 310a-310d may prevent acceleration-related stresses and disturbances produced by the payload container 308 from affecting other areas of the aircraft (e.g., a cabin area 14), including other cargo containers proximate to the payload suspension system 300.

With respect to FIG. 2, when an aircraft is experiencing a low- or micro-gravity environment (e.g., at state 204c, when an aircraft is at a peak of a parabola), the payload container 308 may also experience a low- or micro-gravity condition. As the payload container 308 is isolated from potential acceleration-related stresses and disturbances, a quality of the low- or micro-gravity condition, with respect to the payload container 308, may be high and uninterrupted by external acceleration-related stresses and disturbances. In this embodiment, the tensile members 310a-310d may maintain a static or consistent free length throughout the parabolic maneuver and the isolation provided by the tensile members 310a-310d may be sufficient for simulating a near-zero gravity condition for the payload.

As depicted in FIG. 3, the tensile members 310a-310d are taut so as to restrict an ability of the payload container 308 to rotate and/or move within the payload suspension system 300. This may be used to minimize movement by the payload container 308. In some implementations, as depicted in the embodiment of FIGS. 4A-4B, tensile members may have a longer length such that an ability of the payload container 308 to rotate and/or move within the payload suspension system 300 is higher.

Figure 4A:
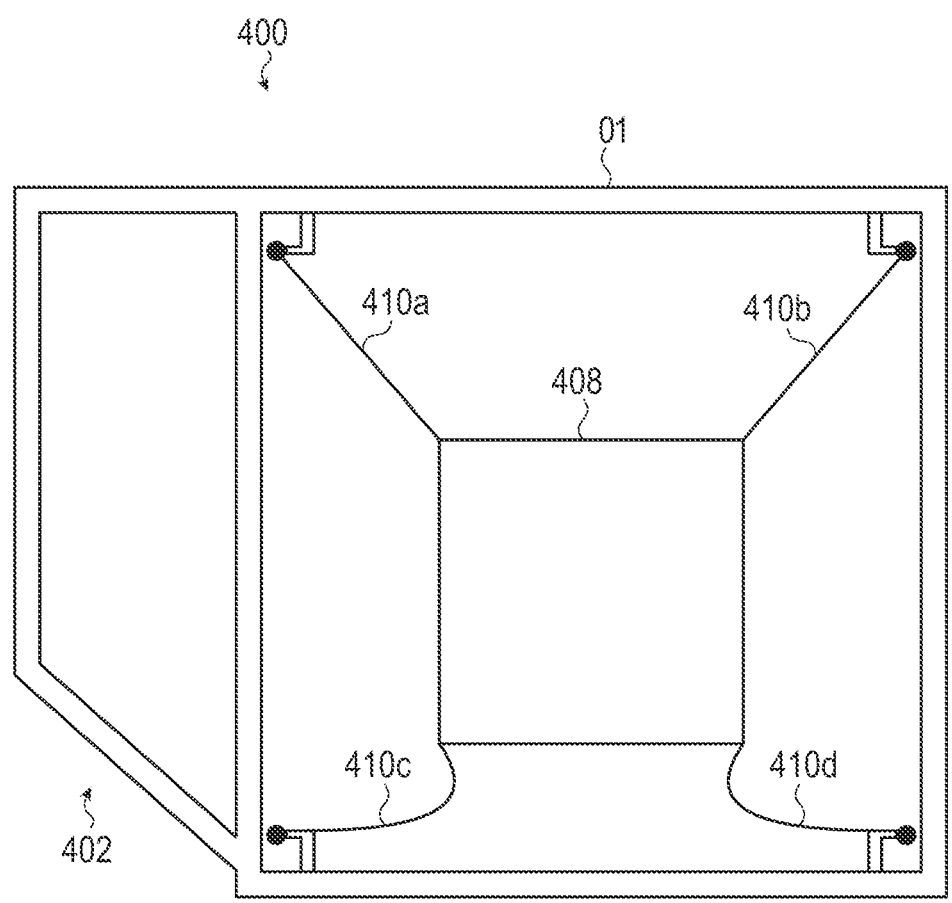
FIGS. 4A-4B depict an example representation of a suspended payload container as suspended by one or more tensile members having an elongated length, with respect to the taut tensile members depicted in FIG. 3, as described herein.
Figure 4B:
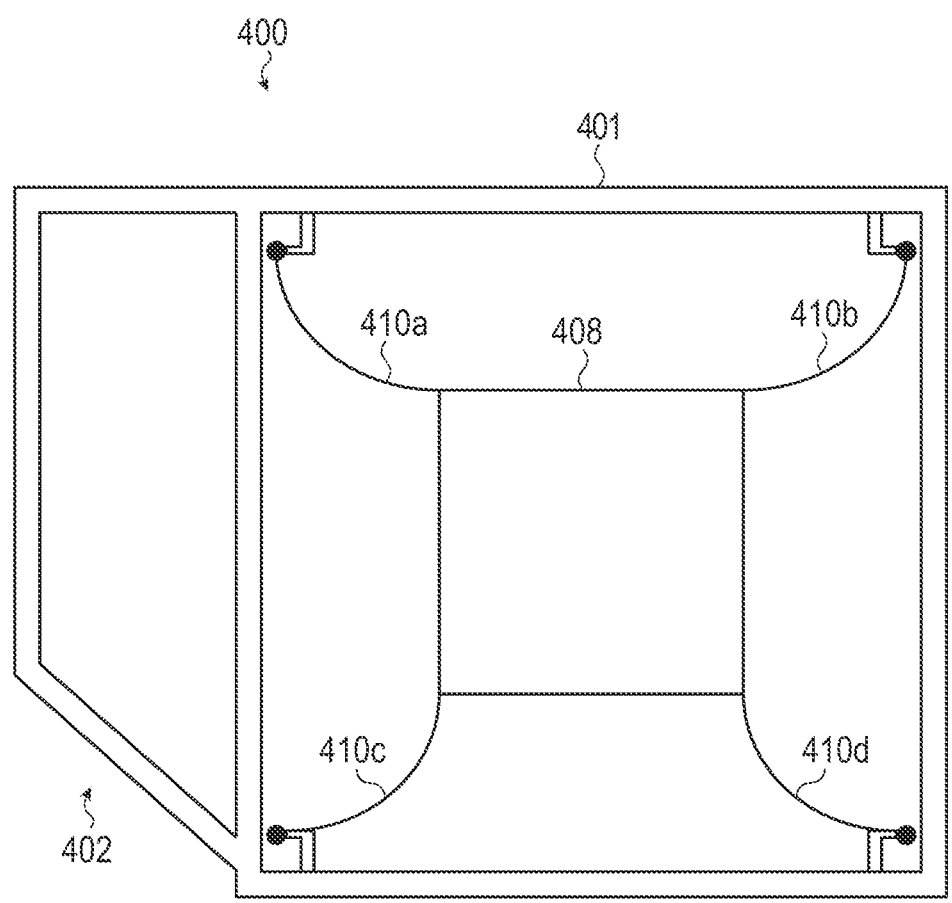

FIGS. 4A-4B depict a graphical representation of a payload suspension system 400 with example tensile members 410a-410d, where the tensile members 410a-410d have a length longer than a length of the tensile members 310a-310d as depicted in FIG. 3. That is, the tensile members 410a-410d may have a length longer than a distance between a frame 401 of the payload suspension system 400 and a corner of the payload container 408 when the payload container 408 is centrally located within the internal cavity. In this way, when the payload container 408 is centrally located, each tensile member 410a-410d may exhibit a degree of slack or play. As the tensile members 410a-410b exhibit some degree of slack or play, the payload container 408 may have a greater ability to move within the internal cavity and may be able to rotate and/or move more freely or partially restrained.

In the payload suspension system 400, an angled deck 402 is depicted, though it is noted that the angled deck 402 may be eliminated in some embodiments. The overall shape and size of the payload suspension system 400 may additionally be different in various embodiments. A structure of the payload suspension system 400 may be similar to that of the payload suspension system 300 depicted in FIG. 3 and duplicative descriptions may be omitted.

In contrast to the payload suspension system 300, as depicted in FIG. 3, the payload suspension system 400 in FIGS. 4A-4B may be provided with tensile members 410a-410d, some of which may have slack or play.

In FIG. 4A, the payload suspension system 400 is depicted as it would appear during a flight conditions experiencing gravitational conditions at or above 1 g. In normal, or hyper-, gravity conditions, the top tensile members 410a-410b may be taut, as the top tensile members 410a-410b sustain the weight of the payload container 408 due to gravitational forces. In contrast, the bottom tensile members 410c-410d may have some degree of slack as no tension is being applied. For example, the bottom tensile members 410c-410d may hang slacked as they may not support the weight of the payload suspension system 400 at the gravitational state at or above 1 g depicted in FIG. 4A.

FIG. 4B depicts the payload suspension system 400 during a low- or micro-gravity environment (e.g., during state 204c in FIG. 2). As the payload container 408 experiences low- or micro-gravity the payload container 408 may experience weightlessness and may rise in comparison to the payload container 408 as it appears in FIG. 4A. As the payload container 408 rises, the top tensile members 410a-410b may loosen, thereby reducing tension in the top tensile members 410a-410b. Further, while the bottom tensile members 410c-410d may tighten to a certain degree, the bottom tensile members 410c-410d may still have a certain degree of slack. As each of the tensile members possesses some degree of slack, the payload container 408 may be able to rotate, sway, and/or otherwise move during a low- or micro-gravity state. This may be beneficial when the quality of a low- or micro-gravity state during an experiment performed by a payload contained within the payload container 408 is desired.

In addition, acceleration-related stresses and disturbances produced by turbulence or an aircraft may be isolated from the payload container 408 as the aircraft operates. As such, a quality of a low- or micro-gravity condition with respect to the payload container 408 may be improved. Yet further, as the payload container 408 possess an ability to move and/or rotate within the payload suspension system 400 (as the tensile members are slacked), the payload container 408 may act as it would if unrestrained. However, the payload container 408 may be sufficiently constrained to prevent contact between the payload container 408 and the frame 401 or other structural elements of the system. When the payload suspension system 400 is no longer under a low- or micro-gravity environment, the payload suspension system 400 may return to the state as depicted in FIG. 4A.

Figure 5A:
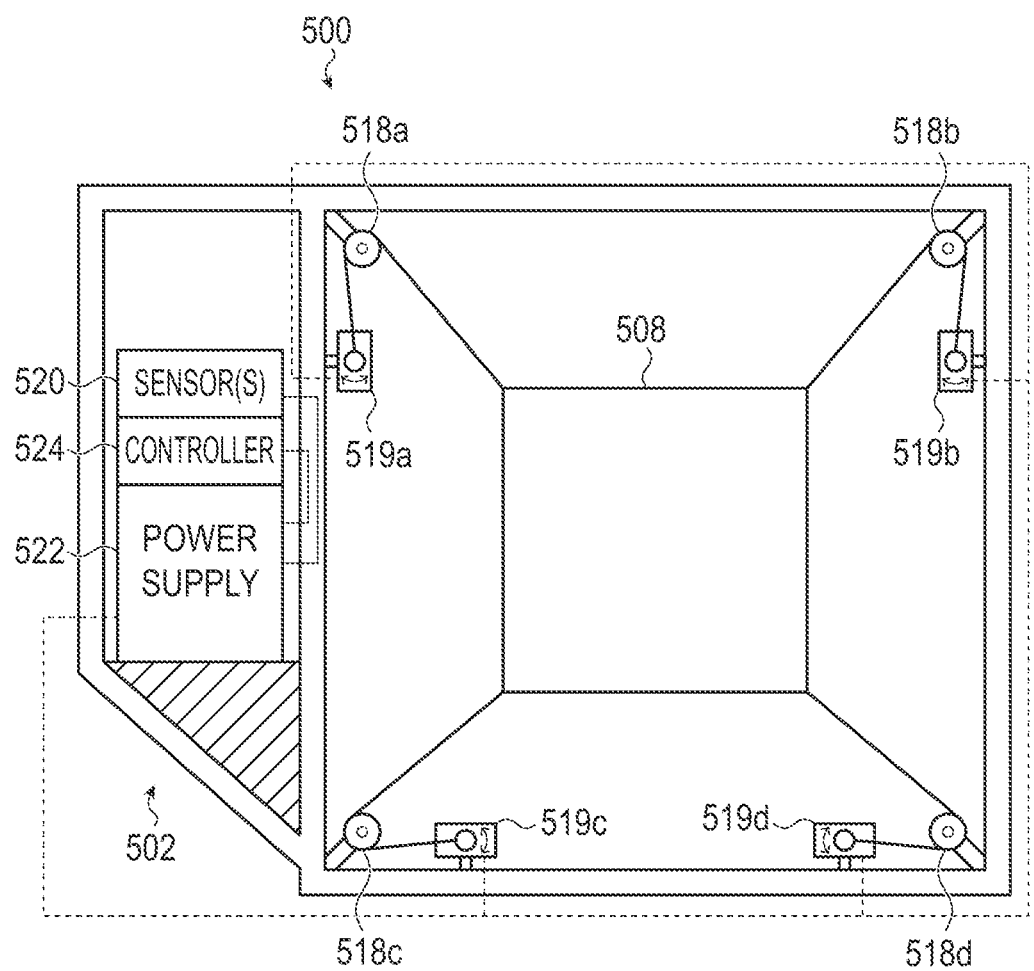
FIGS. 5A-5B depict an example representation of a suspended payload container and associated tensile adjustment components, as described herein.
Figure 5B:
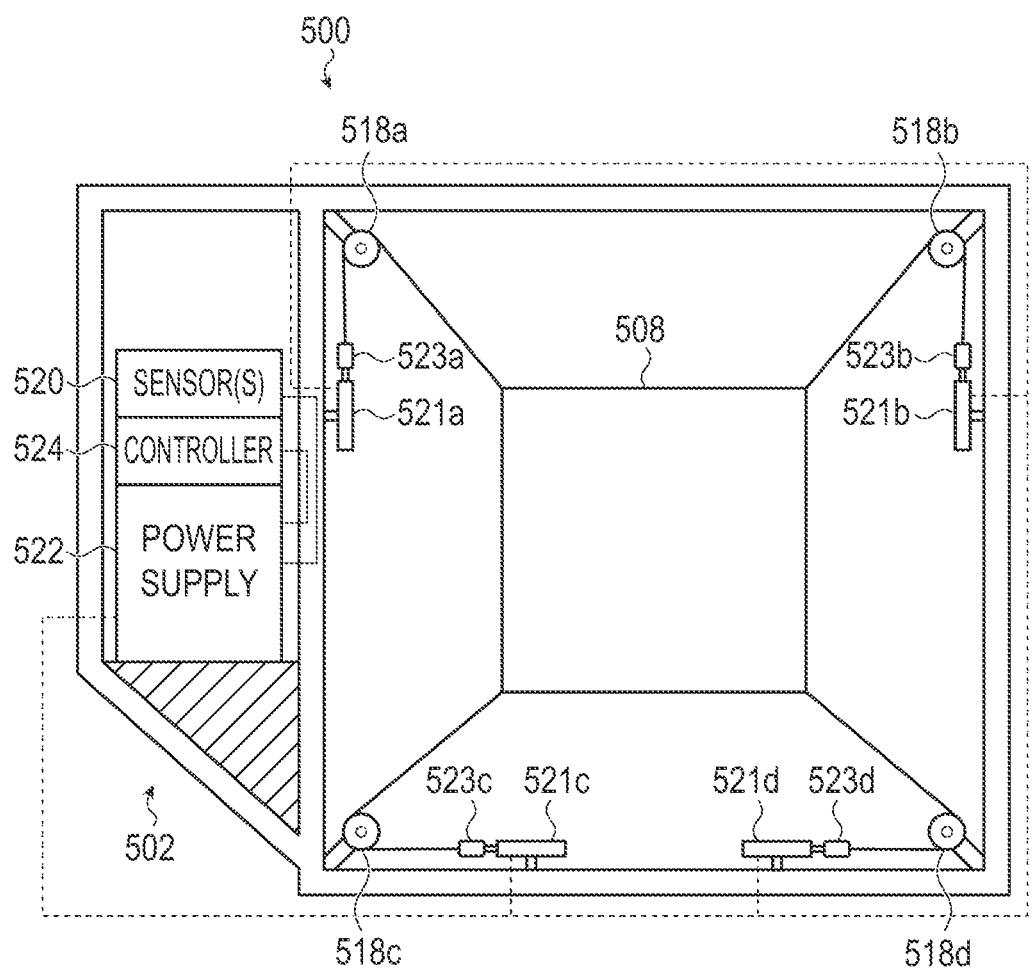

FIGS. 5A-5B depict graphical representations of a payload suspension system 500 including example mechanisms 518a-518d. The mechanisms 518a-518d may be used to adjust a tension in any one of tensile members 510a-510d. Each tension adjustment mechanism 519a-519d may be individually controllable, such that a tension of each tensile member 510a-510d is different, or may be controlled as a group, such that a tension of each tensile member 510a-510d is equivalent.

The payload suspension system 500 may include an angled deck 502. The angled deck 502 may include a power supply 522, a controller 524, and one or more sensors 520. With reference to FIG. 1D, wires extending from the power supply 522, controller 524, and/or sensors 520 may extend into an internal cavity where the payload container 508 is suspended. The power supply 522 may be a battery and/or power system and may provide power to a payload, payload container 508, controller 524, sensors 520, and/or to tension adjustment mechanisms 519a-519d.

As used herein the tension adjustment mechanisms may be a motor or any other mechanism to convert electrical power to mechanical energy. In some cases, the power supply 522 receives power from the aircraft. In some cases, the power supply 522 is a self-contained battery power source. The sensors 520 or sensing system may comprise one or more of a gravimeter, an accelerometer, an altitude sensor, or other similar type of sensor. The controller 524 may include one or more processing units and may control operations of tension adjustment mechanisms 519a-519d and other devices within or outside of the payload suspension system 500. As described herein, the controller 524 may be used to control the tension adjustment mechanisms 519a-519d in response to gravitational conditions detected by sensors 520. While the sensors 520, the controller 524, and power supply 522 are depicted as inside an internal cavity of the payload suspension system 500, the sensors 520, the controller 524, and power supply 522 may be located in any position and may be outside of the payload suspension system 500.

In some embodiments, the controller 524 may operate autonomously and may include an independent power source and independent processing capabilities. For example, sensors 520 of the sensing system may be configured to detect certain gravitational conditions aboard an aircraft. Sensor data produced by the sensors 520 and corresponding to the detected gravitational conditions may be transmitted to and received by the controller 524 where processing may occur. Based on pre-programmed logic, the controller 524 may perform certain functions autonomously, without user interaction, based on the sensor data. For example, when a transition between a gravitational state at or above 1 g to a low- or micro-gravitational state occurs, the controller 524 may control tension adjustment mechanisms 519a-519d to tighten or loosen one or more tensile members.

In some implementations, the controller 524 may be adapted for manual control. For example, gravitational conditions may be detected by sensors 520. Sensor data produced by the sensors 520 may be transmitted, via a network, to a remote device communicatively coupled to the controller 524. A remote device may be a mobile computing device such as a smart phone. The remote device may be provided with an application, including user interfaces providing a degree of control for a user. In some implementations, a user interface may include a control, such as a button, that can be used to control an operation of the system. In some cases, the user interface may be used to control the tension of one or more tensile members. Further, a control element provided within the user interface may, when activated, transition the controller 524 from autonomous to manual control. In some cases, the user interface may include sensor data may be displayed on a display of the remote device and, in response to the sensor data, a user may interact with the application to control aspects of the suspended payload system 500 via the controller 524, such as to loosen and/or tighten tensile members, thereby controlling a movement ability of a suspended payload container 508.

In some embodiments, various monitoring devices (e.g., cameras, microphones, thermometers, accelerometers, and so on) may be provided and may transmit information to a user (e.g., via a network such as the Internet) or may be incorporated in an autonomous system. The user may receive the information (e.g., from a computer, mobile device, or any other electronic device) and may control operations of the suspended payload system 500 remotely (e.g., via a user interface on a mobile device, a computer, or any other electronic device).

In some embodiments, the controller 524 may control operations of a suspended payload system 500, such as tensile adjustment members 519a-519d. In some implementations, a payload may be equipped to perform a set of experiments under low- or micro-gravity conditions.

Accordingly, the payload may include sensors, mechanisms, or other equipment configured to perform the experiments. The controller 524 may be configured to operate the sensors, mechanism, or other equipment in accordance with a testing protocol and may collect experimental data, store experimental data, and perform analyses of the experimental data. The controller 524, when operating under a testing protocol, may monitor conditions and/or physical phenomena within the payload, combine materials, and/or otherwise initiate experimental processes. For example, the controller 524 may initiate processes for releasing agents contained within the payload, providing energy to a specimen, capturing temperature, pressure, or orientation readings, combining material reservoirs, and so on. Further, real-time data from a payload, including, but not limited to, temperature readings, material composition readings, and viscosity, may be collected during parabolic flight, may be transmitted to external electronic devices, and/or may be stored within an internal memory. Additionally, support services such as a stand-alone power system with electrical interfacing, sensors, and data acquisition and monitoring systems, including high-quality video, audio, temperature, pressure, gravimeters, accelerometers, and communication units on board the aircraft for remote payload monitoring and operations may be provided.

A set of tension adjustment mechanisms 519$a$-519$d$ may be provided within the internal cavity and may be coupled to the power supply 522 via one or more conduits, cables, or other similar electrical connections. The set of tension adjustment mechanisms 519$a$-519$d$ may be any device capable of producing mechanical energy and may convert electrical energy to mechanical energy. Each tension adjustment mechanism of the set of tension adjustment mechanisms 519$a$-519$d$ may be coupled to a respective machine 518$a$-518$d$. The set of tension adjustment mechanisms 519$a$-519$d$ may provide mechanical energy to the machines 518$a$-518$d$ so as to cause a movement with the machines 518$a$-518$d$. In some implementations, the tension adjustment mechanisms 519$a$-519$d$ may couple directly to the tensile members 510$a$-510$d$ and may use the machines 518$a$-518$d$ to reduce a required force.

As depicted in FIGS. 5A-5B, the machines 518$a$-518$d$ may be a set of pulleys and the set of tension adjustment mechanisms 519$a$-519$d$ may cause the pulleys to rotate, thereby adjusting a tension of the tensile members 510$a$-510$d$. That is, the tension adjustment mechanisms 519$a$-519$d$ may rotate in one direction (e.g., clockwise) to tighten the tensile members 510$a$-510$d$ and may rotate in an opposite direction (e.g., counterclockwise) to loosen the tensile members 510$a$-510$d$.

Though the machines 518$a$-518$d$ are described and depicted as pulleys, any mechanism or machine capable of adjusting tension of a tensile member, or assisting in adjusting a tension, may be used in accordance with the provided disclosure. For example, an eccentric cam may be used to tighten and/or loosen a tensile member between various states. In some cases, a wheel, axel, and/or level may be used as a tension adjustment mechanism, either alone or in combination.

The controller 524 may be operable to control operations of the tension adjustment mechanisms 519$a$-519$d$ in response to data from the sensors 520. For example, the sensors 520 may be used to detect a first transition from a non-microgravity state to a low- or micro-gravity state and a second transition from a low- or micro-gravity state to a gravitational state at or above 1 g. In response to detecting the first transition, as determined by the controller 524, the controller 524 may cause the tension adjustment mechanisms 519$a$-519$d$ to decrease a tension of at least some of the tensile members 510$a$-510$d$, thereby providing the payload container 508 with an increased movement/rotational ability. Similarly, in response to detecting the second transition, the controller 524 may cause the tension adjustment mechanisms 519$a$-519$d$ increase a tension of at least some of the tensile members 510$a$-510$d$. Though the controller 524 is described as causing an increase or a decrease in tension of the tensile members 510$a$-510$d$, the controller 524 may cause, via the tension adjustment mechanisms 519$a$-519$d$, any variation of the tensile members 510$a$-510$d$.

In some embodiments, the controller 524 may cause the tension adjustment mechanisms 519$a$-519$d$ to provide a small nudge, or jolt, to the tensile members 510$a$-510$d$ in response to a transition. The nudge or jolt may be used to shock the tensile members 510$a$-510$d$ to remove any inertial tension from the tensile members 510$a$-510$d$. In some implementations, the controller 524 may be directly controllable by an operator such that an operator may directly control a tension of any of the tensile members 510$a$-510$d$. One or more cameras may optionally be provided in order to determine if the payload container 508 is centered and/or in danger of hitting a frame 501 of the payload suspension system 500. If the payload container 508 is in any potential danger, an operator may hit an override control and may take any corrective action. In some cases, sensors may be used to determine if a payload container 508 is in danger of hitting a frame 501 and such sensor data may be provided to the controller 524 to automatically impact corrective action. Such corrective action may be short and/or have a small acceleration so as to not significantly affect a low- or micro-gravity condition experienced by the payload container 508.

As depicted in FIG. 5B, a set of linear actuators 521$a$-521$d$ may be provided within an internal cavity of the payload suspension system 500 and may be used to control a tension of a tensile member, to replace the tension adjustment mechanisms 519$a$-519$d$. The set of linear actuators 521$a$-521$d$ may increase or decrease a free length of a tensile member provided to the set of machines 518$a$-518$d$ and may be used to offer fine adjustment control of the set of tensile members 510$a$-510$d$. As discussed with respect to FIG. 5A, a controller 524 may control operations of the set of linear actuators 521$a$-521$d$ and a control of the set of linear actuators 521$a$-521$d$ may occur in response to sensor data (e.g., from sensors 520). In addition, a set of couplers 523$a$-523$d$ may be used to couple the set of tensile members 510$a$-510$d$ to the set of linear actuators 521$a$-521$d$. The set of linear actuators 521$a$-521$d$ may include, without limitation, any type of linear actuator including leadscrews, pneumatic or hydraulic cylinders, solenoids, cams, piezoelectric actuators, or any combination thereof. The set of couplers may include any form of coupler, such as cable couplers, including devises, pins, hooks, or any combination thereof.

Figure 6A:
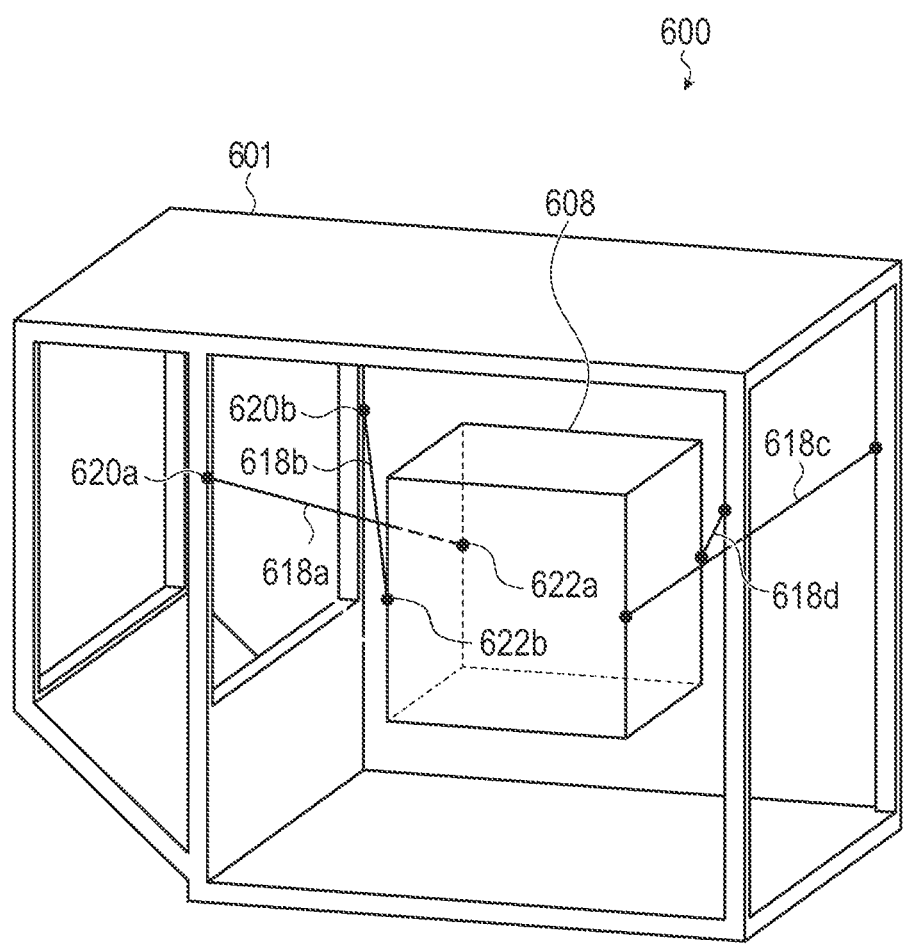
FIGS. 6A-6C depict examples of payload suspension systems having tensile members that can control movement of a suspended payload container during a parabolic flight maneuver, as described herein.
Figure 6B:
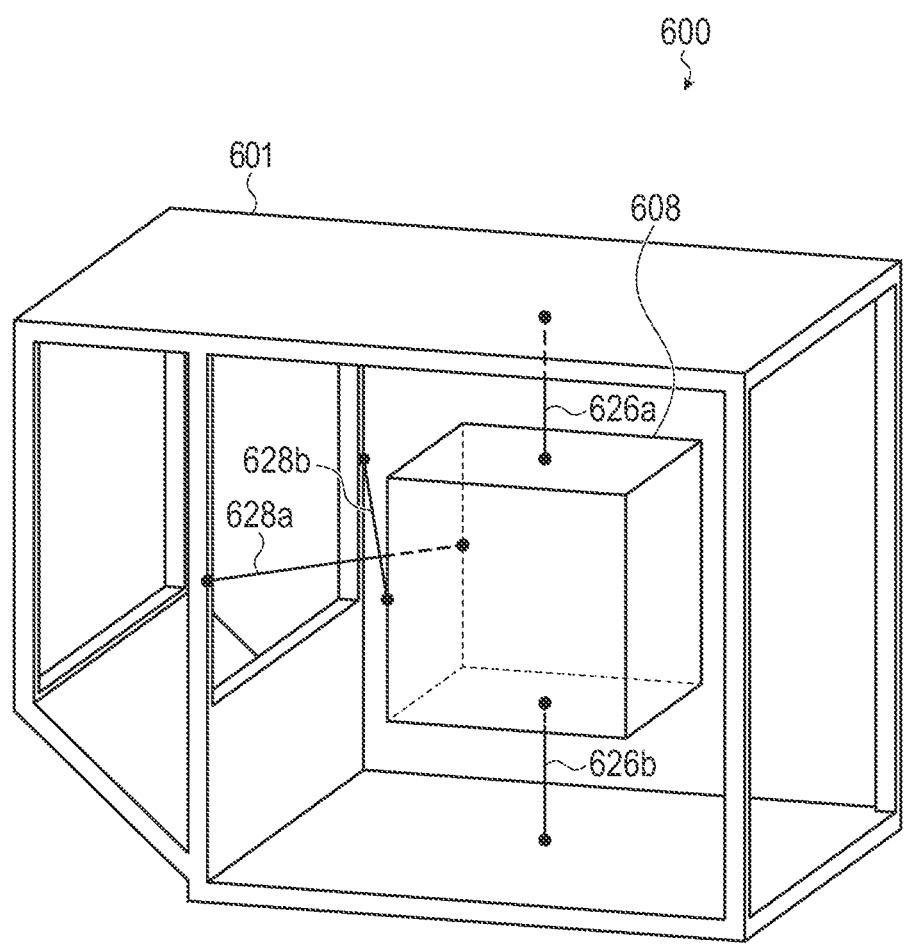
Figure 6C:
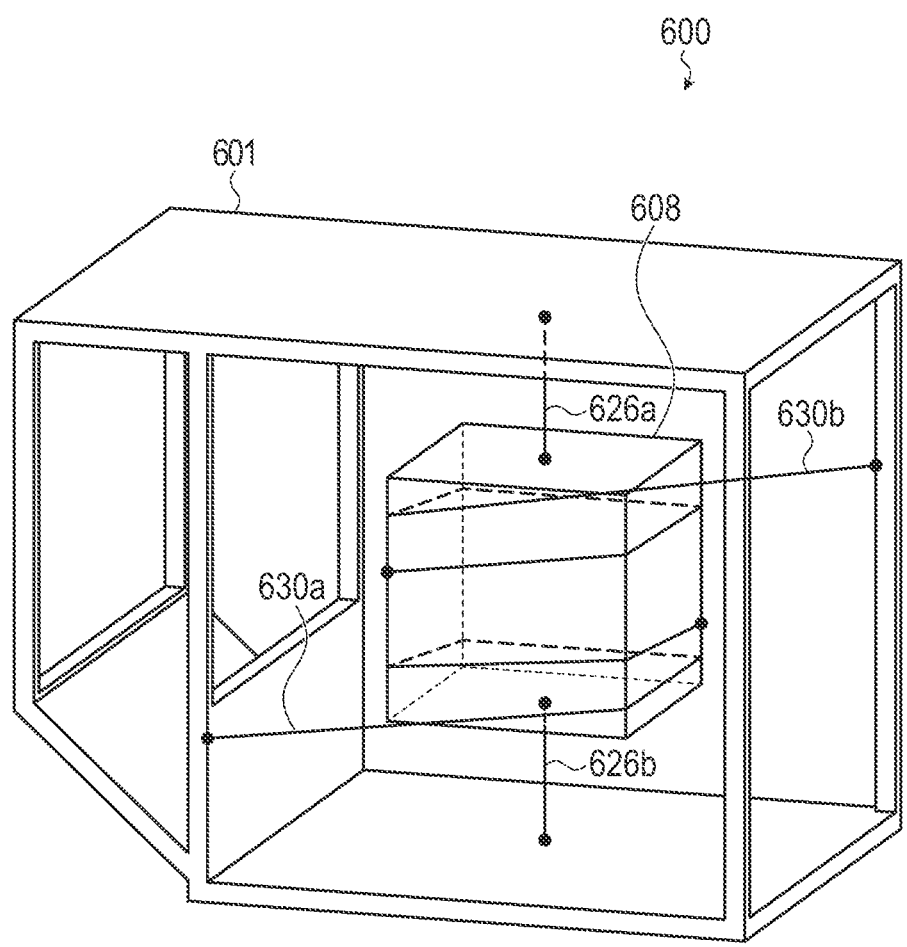

FIGS. 6A-6C depict an examples of a payload suspension system 600 having tensile members that can control movement of a suspended payload container during a parabolic flight maneuver, as described herein. The payload suspension system 600 can be an example of the payload suspension systems described herein (e.g., payload suspension system 100) and include a payload container 608 suspended from a frame 601 of the payload suspension system 100. The set of tensile members may be affixed to points within an internal cavity of the frame 601, at one end, and may be affixed to corners of the payload container, at an opposite end. This arrangement allows the payload container 608 to be suspended within the internal cavity of the payload suspension system 600.

In a first example, as shown in FIG. 6A, the payload suspension system 600 can include tensile members 618*a*-618*d* that are configured to control rotation of the payload container 608 about one or more axes. For example, the tensile members 618 can each have a first end 620 that is fixed to the frame 601 and a second end 622 that is fixed to the payload container 608. For example, each first end 622 may be fixed to a vertical edge approximately halfway between the top and the bottom of the payload container 608. A first tensile member 618*a* may be configured in an opposing relation to a second tensile member 618*b*. For example, the first tensile member 618*a* can have a first end 620*a* that is fixed to the frame 601 above the second end 622*a* and the second tensile member 618*b* can have a first end that 620*b* that is fixed to the frame 601 above a second end 622*b*. Additionally, the mounting points can cause the first and second tensile members 618*a* and 618*b* to cross. A third tensile member 618*c* and a fourth tensile member 618*d* can have a similar opposing relationship on a different (e.g., opposite) side of the payload container 608 as the first and second tensile members 618*a*, 618*b*.

The tension of each tensile member 618 may be independently controlled to control movement of the payload container 608, for example, during a parabolic flight maneuver. As one example, the tension of each tensile member 618 may be controlled to cause the payload container 618 to rotate during a parabolic flight maneuver. For example, in response to initiating a parabolic flight maneuver, tension on the first tensile member 618*a* and the third tensile member 618*a* may be increased and tension the second tensile member 618*b* and the fourth tensile member 618*d* may be decreased thereby causing the payload container 608 to rotate. The payload container can be stabilized at the end of a parabolic flight maneuver by causing each tensile member 618 to retract and apply an approximately equal tension, as described herein.

In another example, as shown in FIG. 6B, the payload suspension system 600 can include a first set of tensile members 626 and a second set of tensile members 628 that cause the payload container to rotate about a single axis. For example, the first set of tensile member 626 may be positioned along a single axis. The first tensile member 626*a* may be fixed to a top portion of the payload container 608 and a top portion of the frame 601 and a second tensile member be fixed to the bottom portion of the payload container 608 and a bottom portion of the frame 601 in an axial relationship. The second set of tensile members 628 may include a third tensile member 628*a* that is in an opposed relationship to a fourth tensile member 628*b*, for example as described in relation to FIG. 6A. During a parabolic flight maneuver, tension on the third tensile member 628*a* may be increased (e.g., the third tensile member is retracted by an actuator) and tension on a fourth tensile member 628*b* can be decreased (e.g., the fourth tensile member can be extended by an actuator). The tension on the first set of tensile member 626 may be maintained, which may cause the payload container 608 to rotate about the axis defined by the first set of tensile members 626. For example, the first set of tensile members 626 may apply force along a vertical axis to maintain the payload container 608 in a fixed vertical location, and the second set of tensile members 628 may apply a net force that is at least partially transverse to the vertical axis to rotate the payload container about the vertical axis. Two sets of tensile members are shown for exemplary purposes and the payload suspension system 600 can have additional tensile members and/or different mounting locations to control movement of the payload container 608 in different directions or along different axes.

FIG. 6C shows an example of a payload suspension system 600 in which the tensile members 630 are configured to cause a greater degree of rotation of the payload container 608. For example, a second set of tensile members 630 may wrap around the payload container 608, which enables to the payload container 608 to be rotated about the axis defined by the first set of tensile members 626 to a greater extent. In some cases, the number of wrappings of the second set of tensile members 630 around the payload container 608 may be configured to control the number of rotations of the payload container during a parabolic flight procedure.

Figure 7A:
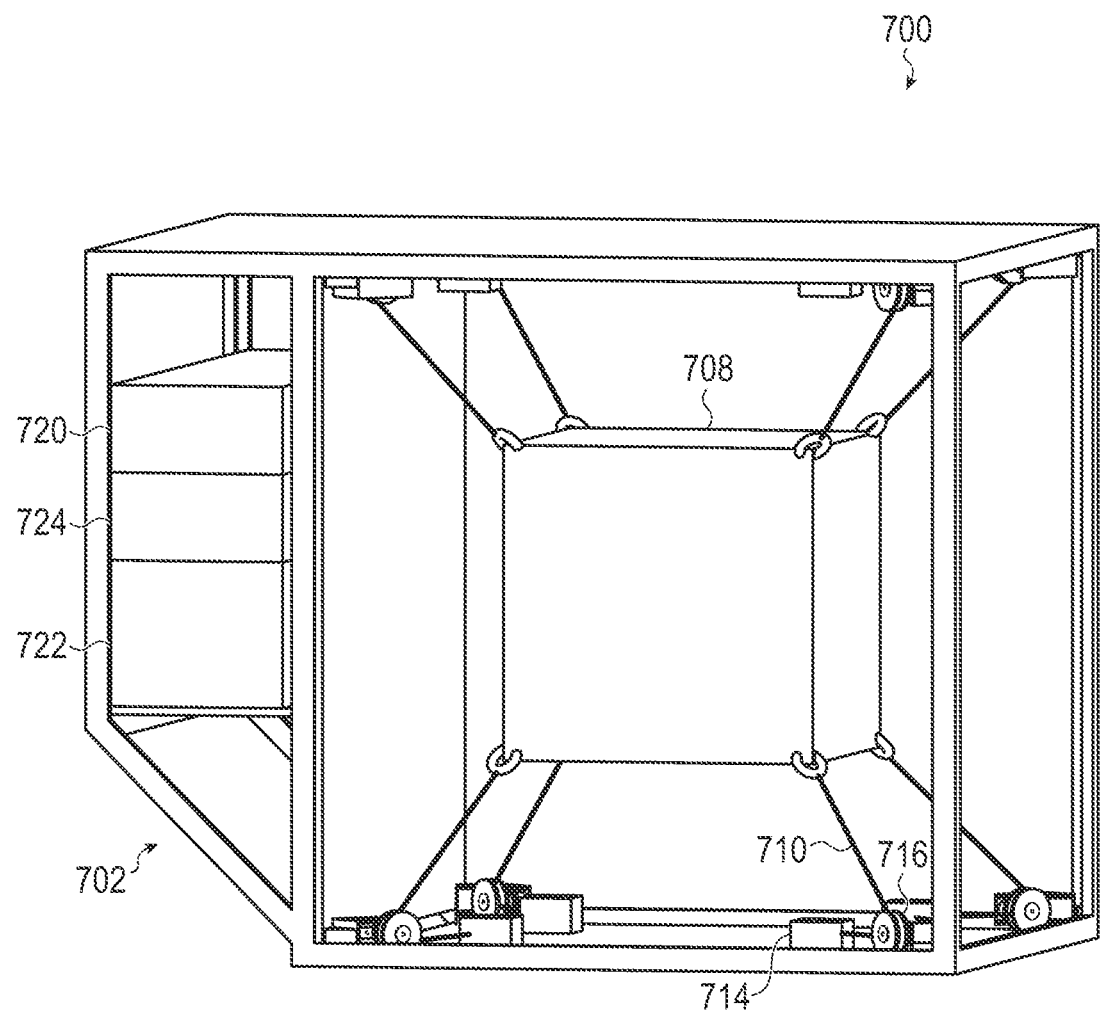
FIGS. 7A-7C depict an example of a payload suspension system having one or more tensile members in different configurations to suspend a payload container, as described herein.
Figure 7B:
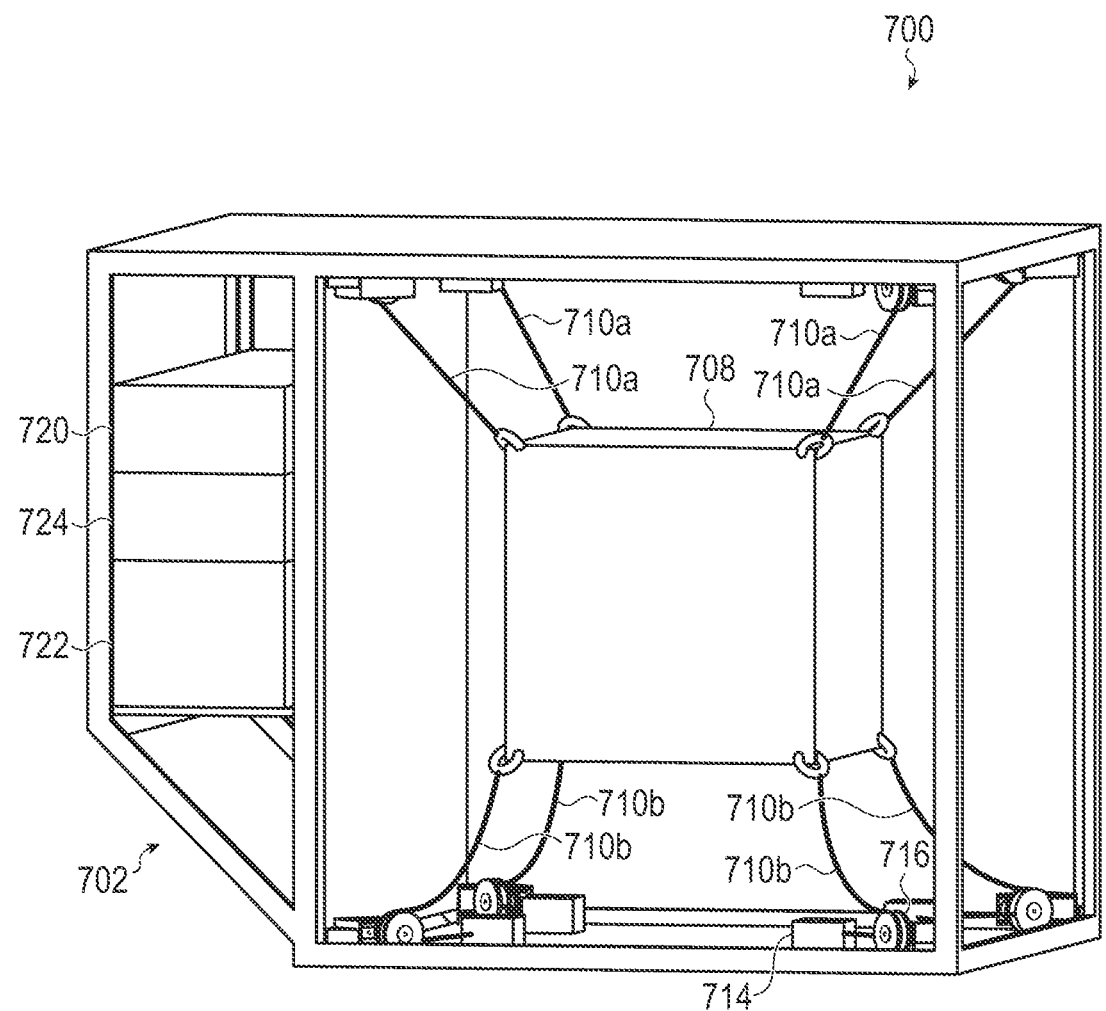
Figure 7C:
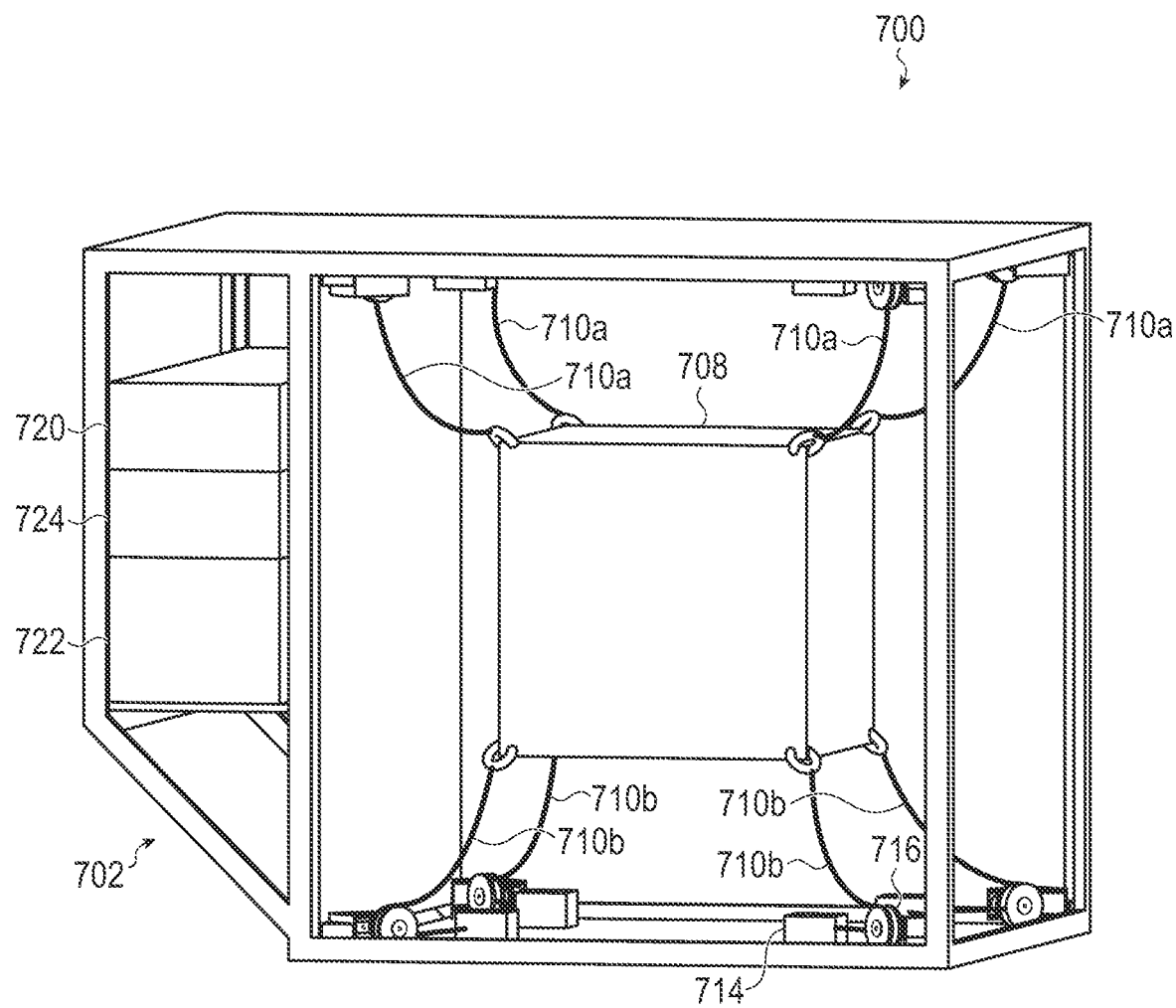

FIGS. 7A-7C depict an example of a payload suspension system 700 having one or more tensile members in different suspension configurations for suspension of a payload container 708, as described herein. The payload suspension system 700 can be an example of the payload suspension system described herein and include an angled deck 702. The angled deck 702 may include a power supply 722, a controller 724, and one or more sensors 720, as described herein. The power supply 722 may be a battery and/or power system and may provide power to a payload, payload container 708, controller 724, sensors 720, and/or to tension adjustment mechanisms 714. The payload container 708 may be suspended by tensile members 710 (one of which is labeled). The tensile member 710 may be coupled to the tensile adjustment mechanism 714, which may control a tension applied to each tensile member 710, as described herein. In some cases, the payload suspension system 700 can include a pulley 716 which may be used to route the tensile member 710 from an attachment point on the payload container 708 and to an attachment point on the tension adjustment mechanism 714.

In some cases, the payload suspension system 700 may have one or more sensors that are configured to measure a tension in the tensile members 710. The sensors may be inline sensors that are coupled to the tensile members 710, such as a strain gauge, load sensors, or any other suitable sensor. In some cases, tension in each tensile member may be measured independently and the measured tension may be used to adjust one or more of the tensile members 710, for example using the tension adjustment mechanism 714. Additionally or alternatively, the payload support system 700 may measure an extended length of each tensile member 710 (e.g., length of the tensile member that is between the adjustment mechanism 714 or pulley 716 and the payload support container). The measured length of various tensile members 710 may be used to determine and/or adjust a position of the payload support container 708 and/or control tension in the tensile members 710.

FIG. 7A shows an example of the tensile members 310 in a taut configuration so as to restrict an ability of the payload container 708 to rotate and/or move within the payload suspension system 700. This may be used to minimize movement by the payload container 708, for example prior to or after a parabolic flight maneuver being performed.

FIG. 7B shows an example of the payload suspension system 700 as it would appear during a flight conditions experiencing gravitational conditions at or above 1 g. In normal, or hyper-, gravity conditions, the top tensile members 710*a* may be taut, as the top tensile members 410*a* sustain the weight of the payload container 708 due to gravitational forces. In contrast, the bottom tensile members 710*b* may have some degree of slack as no tension is being applied. For example, the bottom tensile members 710*b* may hang slacked as they may not support the weight of the payload suspension system 700 at the gravitational state at or above 1 g.

FIG. 7B may also correspond to a state of the payload suspension system 700 during a transition state in which the bottom tensile members 710*b* are released or put into a slack condition to allow payload container 708 to release any potential or kinetic energy before the top tensile member 710*a* are released in response to the system being subjected to a zero- or micro-gravity condition. By releasing the bottom tensile members 710*b* first, the payload container 708 is allowed to temporarily hang or be suspended by the top tensile members 710*a*, allowing the payload container 708 to stabilize before being fully released.

FIG. 7B may also correspond to a static state of the payload suspension system 700 in which the top tensile members 710*a* are in tension and support the payload container 708 when the system is subjected to gravitational conditions that allows for a sufficient downward force on the payload container 708. Similar to the example of FIGS. 4B and 4C, due to the slackened bottom tensile members 710*b*, the payload container 708 may be allowed to float during zero- or micro-gravity conditions.

FIG. 7C depicts the payload suspension system 700 during a low- or micro-gravity environment (e.g., during state 204*c* in FIG. 2). As the payload container 708 experiences low- or micro-gravity the payload container 708 may experience weightlessness and may rise in comparison to the payload container 708 as it appears in FIG. 7A. As the payload container 708 rises, the top tensile members 710*a* may loosen, thereby reducing tension in the top tensile members 710*a*. Further, while the bottom tensile members 710*b* may tighten to a certain degree, the bottom tensile members 710*b* may still have a certain degree of slack. As each of the tensile members possesses some degree of slack, the payload container 708 may be able to rotate, sway, and/or otherwise move during a low- or micro-gravity state. This may be beneficial when the quality of a low- or micro-gravity state during an experiment performed by a payload contained within the payload container 708 is desired, as described herein.

The tension adjustment mechanisms 714 may be control a tension in each of the tensile members 710 based on one or more detected flight parameters. In some cases, the sensors 720 may be configured to detect gravitational conditions and the controller 724 may cause the tension adjustment mechanism 714 to adjust tension on the tensions members 710 based on the detected gravitational conditions. In other cases, payload suspension system 700 may receive communications from an aircraft or other systems that indicate a transition to a parabolic flight maneuver (or other transition in flight parameters) or a transition between different stages of a flight maneuver. For example, the sensor 720 may detect that the aircraft is experiencing gravitational conditions (e.g., gravity at about 1 G prior to performing a parabolic flight procedure) and cause each tensile members 710 to be in a taught configuration such as shown in FIG. 7A to stabilize the payload container.

As the parabolic flight procedure is performed, the sensor 720 may detect a change in the gravitational conditions and cause the tension adjustment mechanism 714 to adjust tension in one or more of the tensile members 710. For example, in response to an injection procedure, (e.g., detected by the sensor 204 or based on a signal received by the controller 724 from the aircraft) the tension adjustment mechanism may decrease a tension in the bottom tensile members 710*b*, such as shown in FIG. 7B. For example, the upward trajectory of the plane may primarily impart a force on the top tensile members 710*a*. As the aircraft transitions to a microgravity environment, the controller 724 may cause the tension adjustment mechanism 714 to decrease a tension on all of the tensile members 710 so that the payload container 708 is isolated from the aircraft, as described herein. In some cases, as the aircraft exits the parabolic flight, the controller 724 may cause an increase in tension in some or all of the tensile members 710 to stabilize the payload container 708 as the aircraft begins to experience an increase in gravitational forces. In some cases, determining changes in the gravitational conditions may include comparing the sensed conditions to one or more defined criteria. For example, the criteria can include a time-averaged change or other change that differentiates between transient events (e.g., turbulence) and gravitational changes due to a flight maneuver such as a parabolic flight maneuver.

Additionally or alternatively, detected or signaled changes in the flight conditions may be used to trigger a sensing protocol for an experiment being performed in the payload container. For example, a transition to a micro-gravity state may trigger a testing script that causes one or more sensors associated with the experiment to collect data or indicate that the parabolic flight maneuver has been initiated. In some cases, a first sensing protocol may be performed prior to the flight maneuver and a second sensing protocol may be performed during the flight maneuver (e.g., higher sampling rate, modifying one or more testing conditions, initiating an experimental process, and so on). In some cases, the payload suspension system 700 may trigger one or more actions in response to detecting or determining an exit from a flight maneuver, such as a parabolic flight maneuver. For example, the process 720 may cause one or more sensors to stop collecting data and/or download and transmit data to one or more remote sources (e.g., for analysis). In other cases, the process 720 may modify experimental conditions such as stopping an experimental process.

As one example, the payload suspension system 700 may be configured to perform a chemical reaction in the payload container 708 during micro- or zero-gravity conditions simulated by a parabolic flight maneuver. In response, to detecting a change to a micro- or zero-gravity environment, the payload suspension system 700 (e.g., the processor 720) may cause two or more reactants to mix and/or initiate a sensing protocol at sensors associated with the experiment. Accordingly, the system may perform the experiment and collect data during the parabolic flight maneuver. In some cases, upon detecting a transition from the micro- or zero-gravity conditions to positive gravity, the payload suspension system may cause and/or signal the experimental system to indicate that the micro- or zero-gravity conditions are over, which may cause the experiment to enter a different protocol (e.g., ending the chemical reaction and/or stopping sensing).

Figure 8:
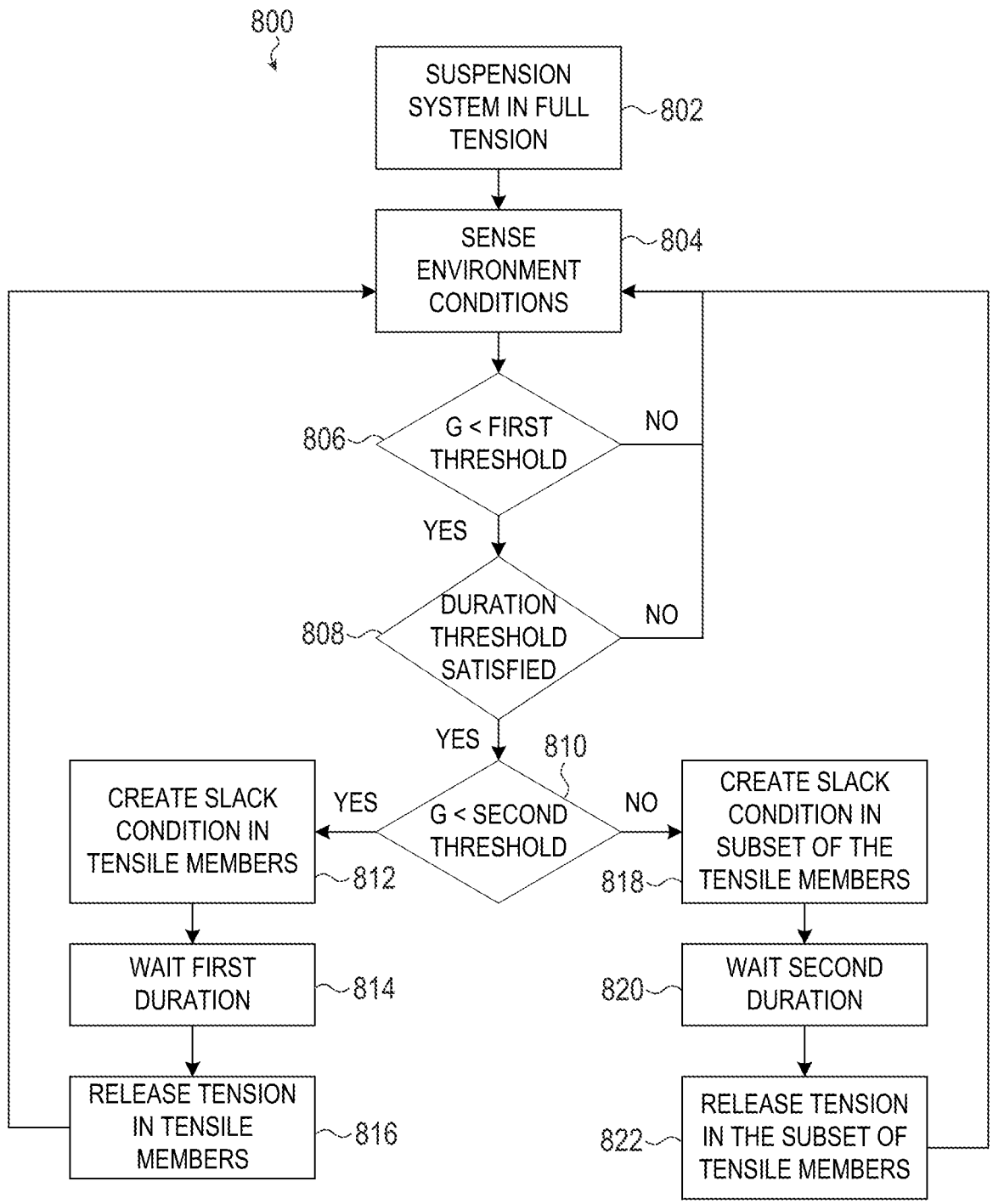
FIG. 8 depicts an example process flow for controlling tension in a payload suspension system, as described herein.

FIG. 8 depicts an example process 800 for controlling tension in a payload suspension system, as described herein. The process 800 may be used to control tension in one or more of the tensile members in response to detected environmental conditions such as changes in gravity experienced by the payload support systems described herein.

At operation 802, the process 800 includes stabilizing a payload container by applying a tension to the tensile members. In some cases, a controller may cause one or more actuators to equally tension each tensile member so that the payload container is statically secured within the payload suspension system. Additionally or alternatively, the system may determine a position of the payload container within the frame and adjust one or more of the tensile members to adjust the location of the payload container with respect to the frame. For example, the system may monitor a deployed length of each tensile member to determine the location of the payload container within the frame and adjust the length of each tensile member to position the payload container within a defined location. In some cases, the system may define an envelope and/or other set of parameters for defining a location of the payload container, which may account for some variability in location.

At operation 804, the process 800 can include sensing environment conditions of the payload support system and/or the payload container. For example, the payload support system may include sensors that measure a gravitational force of the environment and detect transitions between gravitational conditions (e.g., change from positive gravitational position to micro- or zero-gravitational conditions). The sensors may transmit the gravitational measurements to the control unit, which may control the tensile members in response to the measured conditions, as described herein.

In some cases, the environment sensing may be used to control the payload support container during different simulated gravitational conditions. For example, an aircraft may perform multiple different flight maneuvers that simulate different gravitational conditions such as micro- or zero-gravity conditions which may be experienced in some orbital conditions and/or low gravity conditions, which may be experiences in planetary or lunar orbital conditions. For example, an aircraft may perform a first parabolic flight procedure that simulates a zero-gravity condition and subsequently perform a second parabolic flight procedure that simulates low gravity, such as gravity that may be experienced in a lunar orbit. The sensed environment conditions may be used to control tension in one or more of the cables as described herein.

At operation 806, the process 800 can include determining if the gravitational forces experienced by the payload support system are below a first threshold. The first threshold may be a defined decrease in gravitational conditions such as a change from earth gravity to a low gravity state. In some cases, the first threshold may be set to gravitational conditions in which the payload support container may still require some support to prevent it from contacting the frame, but that may occur in some types of simulate and/or orbital conditions. For example, the first threshold can be set for low gravity simulated flights, which may simulate lunar or planter orbits, and where the gravitational forces would still be high enough to cause the payload support container to drop within the frame or move in other undesirable ways. In response to the system determining that the measured gravitational forces are below the first threshold, the process 800 may progress to operation 808 and in response to the system determining that the measured gravitational forces are above the first threshold, the process 800 may continue to sense environmental conditions at operation 804.

At operation 808, the process 800 can include determining if the sensed gravitational forces remain below the first threshold for a duration threshold. This process may be used to differentiate from transient changes in gravity (e.g., due to turbulence) and a transition to a longer-term low gravity state such as experienced during a parabolic flight, suborbital flight and/or orbital flight, as described herein. In some cases, the duration may be a predefined value. The duration threshold may be based on particular flight parameters, for example, a parabolic flight may have a first threshold duration and a orbital flight may have the same or different threshold duration. In some cases, the duration threshold may be dynamically determined, such as analyzed as a time averaged value. Additionally or alternatively, the duration threshold may be based on the measured gravitational conditions. For example, the duration threshold may be adjusted if the measured gravitational forces have stabilized to constant value indicating that the current conditions are stable.

In response to the measured gravitational forces remaining below the first threshold for the duration threshold, the process 800 may progress to operation 810. In response to the measured gravitational forces not satisfying the duration threshold (e.g., the measured gravitational forces being above the first threshold), the process 800 may continue to sense environmental conditions at operation 804.

At operation 810, the process 800 may include determining whether the measured gravitational conditions satisfy a second threshold. The second threshold may define a second set of gravitational conditions that are used to determine how much support needs to be applied to the payload container. For example, the first threshold may be used to indicate a transition to lower gravity conditions, while the gravitational conditions experienced by the payload support system at the first threshold may still be enough to cause unwanted movement of the payload container. For example, the gravitational forces experiences by the box at the first threshold (and above the second threshold) may cause the payload container to contact the frame if unsupported. The second threshold may define a set of gravitational conditions where the payload container may be unsupported within the frame. For example, the second threshold may be set to indicate when the payload support system has transitioned to a micro- or zero-gravity condition.

In response to the system determining that the measured gravitational forces are below the second threshold, the process 800 may progress to operation 812 and in response to the system determining that the measured gravitational forces are above the threshold, the process 800 may continue to sense environmental conditions at operation 804. In some cases, operation 810 may include satisfying a duration threshold (e.g., similar to operation 808) where the measured gravitational forces remain below the second threshold for a defined duration.

Operations 812 through 816 may be performed in response to determining that the payload support system is experiencing micro- or zero-gravity conditions and include controlling the tension in the tensile members in accordance with the micro- or zero-gravity environment, as described herein. Operation 812 may be used to remove potential, kinetic, or other residual energy from the payload container prior to fully releasing all tension on the supporting tensile members. Operation 812 may include creating a slack condition in one or more of the tensile members, which reduces a tension in the tensile members while still constraining movement of the payload support container.

In some cases, operation 812 may include introducing slack in one or more of the tensile members, which may include causing the actuators to let out a defined amount of the tensile member to decrease the tension in the system. For example, in some cases, the actuators may each let out a set amount of each tensile member (e.g., 1 inch), which cases the system to go slack and decrease the tension, but still prevents the payload container from moving by more than a set amount. Accordingly, the support from the payload container may be removed and the payload support container may be able to move a limited amount defined by the slack in the tensile members. This may allow the payload support container to dissipate momentum or other energy and help stabilize the support container within the frame.

At operation 814, the process 800 may include waiting a first duration at the slack condition caused by operation 812. In some cases, the duration may be a defined duration of time. In other cases, the duration may be based on one or more measured parameters. For example, in cases where the payload support system measures a tension in each tensile member, the system may determine the first duration based on a measured amount of tension in one or more of the tensile members. In these cases, the first duration may end when the tension in one or more of the tensile members falls below a threshold (e.g., force in all of the tensile members is below a defined force value).

At operation 816, the process 800 may include releasing the tension in all of the tensile members to allow the payload container to move independent of the frame and/or aircraft. For example, the actuators may further extend each tensile member to allow additional movement of the payload support container, as described herein. In some cases, operation 816 may also be used to initiate a testing procedure or other micro- or zero-gravity test as described herein.

Operations 818 through 822 may be performed in response to determining that the payload support system is experiencing lower gravity conditions while the gravitational forces may still be enough to move the payload container if unsupported. For example, in some orbital flights, the planetary or lunar gravity may still be enough to cause the payload support container to contact the frame if the tensile supports were fully released. Accordingly, operation 818 through operation 822 may provide reduced support to the payload container to prevent undesirable contact with the payload support system or aircraft.

At operation 818, the process 800 can include creating a slack conditions in a subset of the tensile members. The slack condition may be similar to that described in operation 812, by reducing tension in a subset of the tensile members. For example, in low gravity conditions (e.g., higher than micro- or zero-gravity conditions) the top set of tensile members may remain in tension while a length of the bottom tensile members is increased (e.g., by the actuators as described herein). Accordingly, the payload container may be supported by the top tensile member to prevent the payload container from falling to the bottom of the frame, but the tensions on the bottom tensile members may be reduced to create a slack condition in the subset of tensile members. This may allow the payload container to stabilize prior to fully releasing the subset of tensile members.

Operation 820 may include waiting a second duration for the payload container stabilize prior to fully releasing the subset of tensile members. The second duration may be a defined duration or may be dynamically determined, for example as described with respect to operation 814.

At operation 822, the process 800 may include further releasing the tension on the subset of tensile members. For example, the actuators may further extend each of the subset of tensile members to allow additional movement of the payload support container, as described herein. This can include releasing the bottom tensile member such that the payload support container is only supported by the top tensile members, which may prevent the payload support container from dropping in the frame, while reducing noise transmitted from the aircraft and to the payload support container. In some cases, operation 816 may also be used to initiate a testing procedure or other micro- or zero-gravity test as described herein.

Additionally or alternatively, the payload support system may continue sense environment conditions, such as a gravitational force, and may adjust the tension in one or more of the tensile members in response to the sensed conditions. For example, in response to determining that the payload support system has transitioned to a micro- or zero-gravity state, the payload support system may release the upper tensile members, which can include progressing through a slack condition as described herein. In response to determining that the gravitational forces are increasing (e.g., above the first threshold), the system may increase the tension in the bottom tensile members to more fully constrain movement of the payload container, as described herein.

Figure 9:
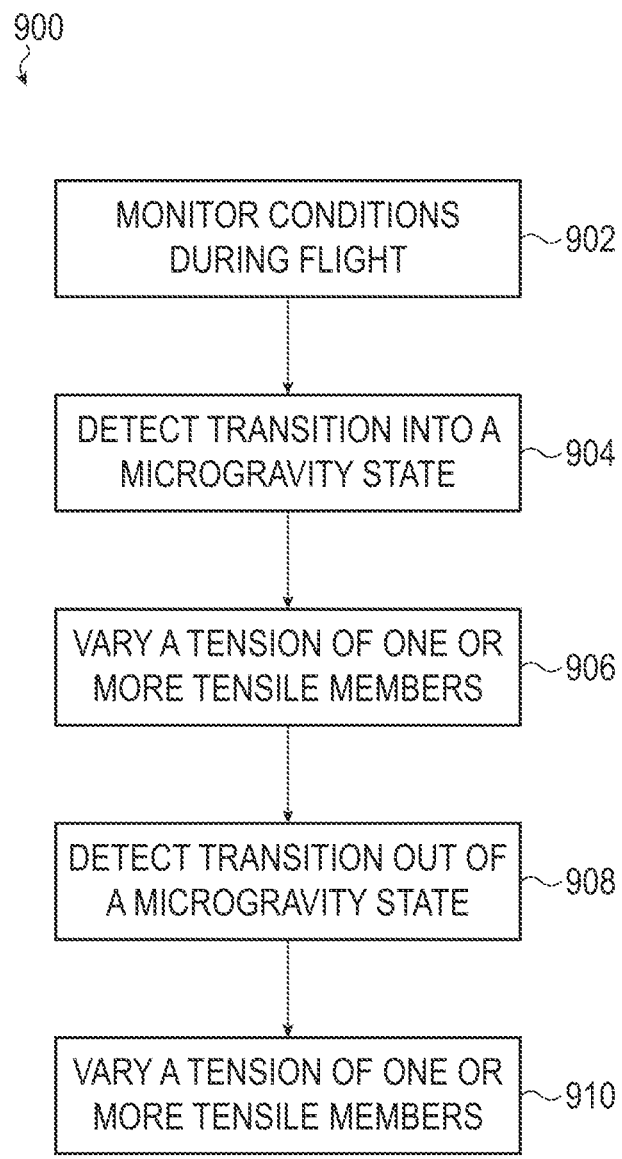
FIG. 9 depicts a flowchart concerning control of one or more tensile members in response to monitored flight conditions, as described herein.

FIG. 9 depicts a flowchart of a method 900 of controlling a tension of one or more tensile members (e.g., using a motor and/or a controller). The method 900 may be performed with respect to the systems described herein (e.g., the systems of FIGS. 5A-5B, FIGS. 6A-6B, or FIGS. 7A-7C) though the method 900 is not limited to being performed within only these apparatuses.

Prior to operation 902, one or more tensile members may be used to secure a payload and/or payload container. The one or more tensile members may be used in a taut state, such as depicted in FIG. 3, so that the payload container has little to no sway and/or rotation allowance. The one or more tensile members may be used in a slacked state, such as depicted in FIGS. 4A-4B, so that the payload container has some degree of sway and/or rotation allowance. The manner and degree that the tensile members are used to secure the payload is not particularly limited and any arrangement suitable for suspending a payload container within an internal cavity may be used in accordance with the provided disclosure.

At operation 902, during a flight, such as a parabolic flight, certain conditions, such as gravitational forces, accelerations, and/or speeds of an aircraft, an altitude of the aircraft, and so on, may be monitored. These conditions may be monitored by one or more sensors (e.g., sensors 520). The sensors may include one or more of: an accelerometer (for measuring acceleration/deceleration values), a gravimeter (for measuring g-forces), an altimeter (for measuring altitude), and other similar type of sensor.

At operation 904, the method 900 (e.g., a controller performing the method 900) may utilize sensors to detect a transition of the aircraft into a low- or micro-gravity state. For example, this operation 904 may correspond to whether an aircraft is within the injection transitional period 203 as depicted in FIG. 2, where the aircraft transitions from a gravitational state at or above 1 g to a low- or micro-gravity state. For example, if an estimated gravitational condition changed by a threshold amount, a transition corresponding to a gravitational condition on an aircraft may be detected. To determine whether the flight is in a low- or micro-gravity state absolute values (e.g., absolute g-forces) or relative values (e.g., corresponding to a threshold change) may be monitored. For example, when a measured gravitational value meets or falls below a certain threshold value (e.g., a value at or below 0.38 g), the flight may be determined to be in a low- or micro-gravity state. Any manner of determining whether an aircraft is in a low- or micro-gravity state may be used in accordance with the provided disclosure. As another example, when an altitude reaches a certain value, the aircraft may be determined to be in a low- or micro-gravity state in accordance with a known flight plan.

Operation 906 may occur if an estimated gravitational condition changed by a particular amount, corresponding to aircraft operations. At operation 906, a tension or one or more tensile members suspending a payload container may be varied and/or adjusted. In a non-limiting example, a tension of the tensile members may be decreased so as to increase a movement/rotational ability of the payload container.

At operation 908, the method 900 (e.g., a controller performing the method 900) may utilize sensors to detect a transition of the aircraft out of a low- or micro-gravity state. For example, this operation 908 may correspond to whether an aircraft is within the recovery transitional period 205 as depicted in FIG. 2, where the aircraft transitions from a low- or micro-gravity state to a non-microgravity state. For example, if an acceleration value increases by a threshold amount (e.g., 50 m/s$^2$), the aircraft may be determined to be in a non-microgravity state. To determine whether the flight is in a non-microgravity state absolute values (e.g., absolute g-forces) or relative values (e.g., corresponding to a threshold change) may be monitored. For example, when a measured gravitational value meets or falls above a certain threshold value (e.g., a value at or above 0.38 g), the flight may be determined to be in a non-microgravity state. Any manner of determining whether an aircraft is in a non-microgravity state may be used in accordance with the provided disclosure. As another example, when an altitude reaches a certain value, the aircraft may be determined to be in a non-microgravity state in accordance with a known flight plan.

Operation 910 may occur after a transition into a non-microgravity state has been detected at operation 908. At operation 910, a tension or one or more tensile members suspending a payload container may be varied and/or adjusted. In a non-limiting example, a tension of the tensile members may be increased so as to decrease a movement/rotational ability of the payload container.

The method 900, as discussed above, may prioritize security during a standard and/or hyper-gravity state so that a payload and/or payload container is prevented from rotating and/or swaying. This may reduce the amount of risk of damage of the payload and/or payload container. During the standard and/or hyper-gravity state, the tensile members may be taut or in-tension in order to reduce or eliminate such movement. That is, at operation 910, a tension of the one or more tensile members may be reverted to the tension established at an initial securement.

The method 900 may prioritize proving a high-quality low- or micro-gravity state while the aircraft is at the peak of a parabolic flight. For example, at the peak of a parabolic flight, environmental test conditions may become more desirable than securement considerations. To cultivate a high-quality low- or micro-gravity state, the tensile members may loosen so that the payload and/or payload container has an increased movement/rotational ability and may move, unencumbered and/or minimally restrained, under microgravity conditions. The payload, therefore, may experience high-quality low- or micro-gravity conditions which may improve a quality of an associated experiment. In accordance with aspects of the provided disclosure, any acceleration-related stresses and disturbances value corresponding to less than $\frac{1}{100}^{th}$ of 1 g may be considered noise and may be ignored.

Figure 10:
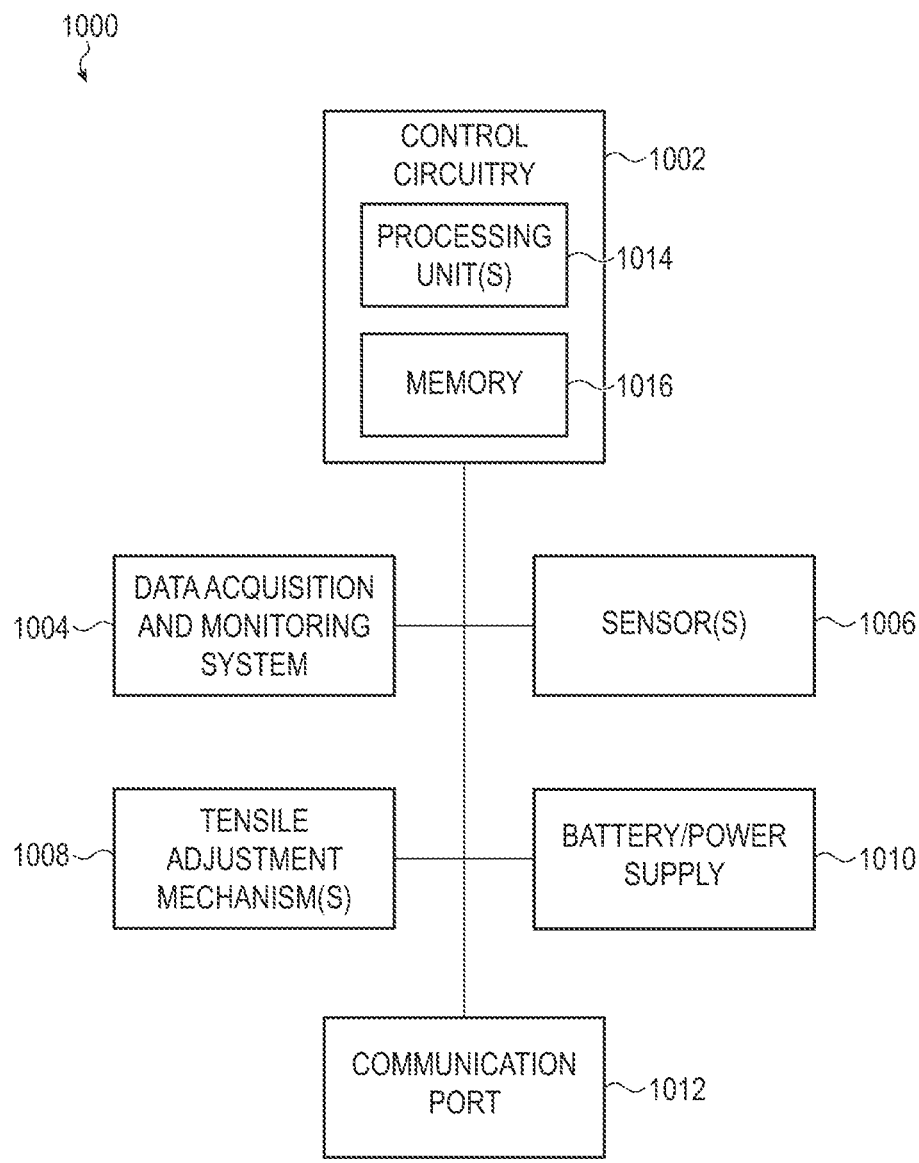
FIG. 10 depicts a representative diagram of components of a payload suspension system, as described herein.

FIG. 10 depicts an example electrical block diagram of a payload suspension system 1000, such as described with reference to FIGS. 5A-5B. The payload suspension system 1000 may include control circuitry 1002 (e.g., a controller), a data acquisition and monitoring system 1004, sensor(s) 1006, tensile adjustment mechanism(s) 1008, a battery/power supply 1010, a communication module 1012, processing unit(s) 1014, and memory 1016.

The payload suspension system 1000 may include control circuitry 1002. The control circuitry 1002 may be implemented in a single control unit and not necessarily as distinct electrical circuit elements. As used herein, "controller" will be used synonymously with "control circuitry." The control circuitry 1002 may receive signals from the processing unit(s) 1014 or from other elements of the payload suspension system 1000. The control circuitry 1002 may control operations of a payload and/or associated systems and may transmit/receive electrical impulses to associated components, such as tensile adjustment mechanism(s) 1008.

The control circuitry 1002 may include processing unit(s) 1014 and memory 1016. The processing unit(s) 1014 may control some or all of the operations of the payload suspension system 1000. The processing unit(s) 1014 may communicate, either directly or indirectly, with some or all of the other components of the payload suspension system 1000. For example, a system bus or other communication module 1012 may provide communication between the control circuitry 1002 (e.g., a controller), the data acquisition and monitoring system 1004, tensile adjustment mechanism(s) 1008, the battery/power supply 1010, the communication module 1012, the memory 1016, or sensor(s) 1016.

The processing unit(s) 1014 may be implemented as any electronic device capable of processing, receiving, or transmitting data or instructions, whether such data or instructions is in the form of software or firmware or otherwise encoded. For example, the processing unit(s) 1014 may include a microprocessor, a central processing unit (CPU), an application-specific integrated circuit (ASIC), a digital signal processor (DSP), a controller, or a combination of such devices. As described herein, the term "processing unit(s)" is meant to encompass a single processor or processing unit, multiple processors, multiple processing units, or other suitably configured computing element or elements. In some cases, the processing unit(s) 1014 may provide part or all of the processing system or processor described herein. It should be noted that the components of the payload suspension system 1000 can be controlled by multiple processors. For example, select components of the payload suspension system 1000 (e.g., the data acquisition and monitoring system 1004) may be controlled by a first processor and other components of the payload suspension system 1000 (e.g., control circuitry 1002) may be controlled by a second processor, where the first and second processors may or may not be in communication with each other.

The memory 1016 may store instructions executable by the processing unit(s) 1014 and configured to perform the functions and operations discussed herein. For example, the memory 1016 may acquire and store data from sensor(s) 1006 and such data may be used (e.g., by the processing unit(s) 1014) during the execution of stored instructions. For example, the memory 1016 may store, for example, research data. The memory 1016 may include any type of memory. By way of example only, the memory 1016 may include random access memory, read-only memory, Flash memory, removable memory, other types of storage elements, or combinations of such memory types.

The data acquisition and monitoring system 1004 may be used to obtain and monitor real-time data from an environment external to a payload (e.g., ambient readings) and/or real-time data from an internal environment of the payload. Real-time data from a payload may include, but is not limited to, temperature readings, material composition readings, viscosity, and so on, and may be collected during parabolic flight. Such real-time data may further be transmitted to external electronic devices and/or may be stored within an internal memory (e.g., memory 1016).

The tensile adjustment mechanism(s) 1008 may be provided external to a payload (e.g., elements 519a-519d as depicted in FIG. 5A) or may be within the payload to control experimental operations. Tensile adjustment mechanism(s) 1008 may be any tope of device to convert electrical power to motive energy including servomotors, linear actuators, DC motors, and so on. The tensile adjustment mechanism(s) 1008 may be operatively connected to, for example, the processing unit(s) 1014, the control circuitry 1002, and/or the data acquisition and monitoring system 1004 and may be controlled in response to manual or autonomous control.

The payload suspension system 1000 may include a battery/power supply 1010 that is configured to provide electrical power to the components of the payload suspension system 1000. The battery/power supply 1010 may include one or more power storage cells that are linked together to provide an internal supply of electrical power. The battery/power supply 1010 may be operatively coupled to power management circuitry that is configured to provide appropriate voltage and power levels for individual components or groups of components within the payload suspension system 1000. The battery/power supply 1010, via power management circuitry, may be configured to receive power from an external source, such as an alternating current power outlet. The battery/power supply 1010 may store received power so that the payload suspension system 1000 may operate without connection to an external power source for an extended period of time, which may range from several hours to several days. The battery/power supply 1010 can be implemented with any device capable of providing energy to the payload suspension system 1000. For example, the battery/power supply 1010 may include one or more batteries or rechargeable batteries. The battery/power supply 1010 may include a power connector or power cord that connects the payload suspension system 1000 to another power source, such as a wall outlet.

The communication module 1012 may be configured to transmit and/or receive signals or electrical communications from an external or separate device. The communication module 1012 may be configured to couple to an external device via a cable, adaptor, or other type of electrical connector. In some embodiments, the communication module 1012 may be used to couple the payload suspension system 1000, or components thereof, to an external computing device, such as a mobile device or a desktop computing device, over a wired or wireless network (e.g., the Internet).

The payload suspension system 1000 may also include one or more sensor(s) 1016 positioned almost anywhere on the payload suspension system 1000. In some cases, the sensor(s) 1016 may include one or more gravimeters or accelerometers, positioned and/or configured as described herein. The sensor(s) 1016 may be configured to sense one or more types of phenomena, such as but not limited to, inertial conditions, gravitational conditions, accelerations, and altitude of an aircraft. The sensors(s) 1016 may additionally detect phenomena including light, force, heat, movement, relative motion, air quality, proximity, position, and surface quality. By way of example, the sensor(s) 1016 may include a heat sensor, a position sensor, a light or optical sensor, a pressure transducer, a gyroscope, a magnetometer, an air quality sensor, and so on. Additionally, the sensor(s) 1016 may utilize any suitable sensing technology, including, but not limited to, interferometric, magnetic, capacitive, ultrasonic, resistive, optical, acoustic, piezoelectric, or thermal technologies. In some implementations, the sensor(s) 1016 may be provided within a payload container and/or within a payload itself.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A payload suspension system for producing a microgravity environment for a payload in an aircraft performing parabolic flight maneuver, the payload suspension system comprising:
    a frame defining an internal cavity;
    a payload container positioned within the internal cavity and configured to hold a payload;
    a set of tensile members suspending the payload container within the internal cavity, each tensile member of the set of tensile members coupled to a respective corner of the payload container;
    a set of tension adjustment mechanisms, each tension adjustment mechanism of the set of tension adjustment mechanisms coupled to a respective tensile member of the set of tensile members and configured to apply a respective tension to the respective tensile member;
    a sensing system configured to produce sensor data that corresponds to a gravitational condition or an inertial condition of the aircraft; and
    a controller configured to:
        using the sensor data, detect a transition of the aircraft from a non-microgravity state to a low- or micro-gravity state; and
        in response to detecting the transition from the non-microgravity state to the low- or micro-gravity state, cause the set of tension adjustment mechanisms to reduce a tension of each tensile member of the set of tensile members.

2. The payload suspension system of claim 1, wherein:
    the transition from the non-microgravity state to the low- or micro-gravity state corresponds to a transition in the aircraft from an increasing pitch condition to a decreasing pitch condition as part of a parabolic flight maneuver.

3. The payload suspension system of claim 1, wherein, in response to the detection of the transition to the low- or micro-gravity state, the controller is configured to cause the set of tension adjustment mechanisms to cause each tensile member of the set of tensile members to become slack.

4. The payload suspension system of claim 1, wherein:
the transition is a first transition;
the non-microgravity state is a first non-microgravity state;
the controller is further configured to, in response to detecting a second transition from the low- or microgravity state to a second non-microgravity state, control the set of tension adjustment mechanisms to increase the tension of each tensile member of the set of tensile members.

5. The payload suspension system of claim 4, wherein:
the transition from the low- or micro-gravity state to the second non-microgravity state corresponds to a transition in the aircraft from a decreasing or neutral pitch condition to an increasing pitch condition as part of a parabolic flight maneuver.

6. The payload suspension system of claim 1, wherein:
the payload suspension system further comprises a set of pulleys; and
each tensile member of the set of tensile members is at least partially wrapped around a respective pulley of the set of pulleys.

7. The payload suspension system of claim 1, wherein:
the payload container comprises an angled deck, the angled deck defining a second internal cavity separated from the payload container by a wall; and
the payload suspension system further comprises a power supply positioned within the angled deck and operably coupled to the set of tension adjustment mechanisms.

8. The payload suspension system of claim 1, wherein the sensing system comprises at least one of a gravimeter, an altimeter, or an accelerometer.

9. A method of simulating a zero-gravity condition for a payload container during a parabolic flight maneuver of an aircraft, the method comprising:
using a sensing system, detect at least one of an acceleration condition or a gravitational force condition with respect to the aircraft;
using a first output from the sensing system, detecting a first transition from a first non-microgravity state of the aircraft to a low- or micro-gravity state of the aircraft; and
in response to detecting the first transition, causing a set of tension adjustment mechanisms to reduce a tension of a set of tensile members coupled to the payload container thereby reducing the positional constraints on the payload container;
using a second output from the sensing system, detecting a second transition from the low- or micro-gravity state of the aircraft to a second non-microgravity state of the aircraft; and
in response to detecting the second transition, causing the set of tension adjustment mechanisms to increase the tension of a set of tensile members coupled to the payload container thereby increasing the positional constraints on the payload container.

10. The method of claim 9, wherein:
the first transition corresponds to a transition of the aircraft from a non-parabolic flight to a parabolic flight; and the second transition corresponds to a transition of the aircraft from parabolic flight to non-parabolic flight.

11. The method of claim 9, wherein a free length of a respective tensile member of the set of tensile members is controlled by a respective tension adjustment mechanism of a set of tension adjustment mechanisms.

12. The method of claim 9, wherein the sensing system includes one or more of an accelerometer or a gravimeter.

13. The method of claim 12, wherein the set of tension adjustment mechanisms are controlled in response to a threshold change in the output of the accelerometer or the gravimeter.

14. The method of claim 9, wherein each tensile member of the set of tensile members is coupled to a respective corner of the payload container.

15. The method of claim 9, wherein:
at a period of time between the first transition and the second transition, the payload container is isolated from external acceleration-related stresses or disturbances generated by the aircraft.

16. The method of claim 9, wherein
at a period of time between the first transition and the second transition, the aircraft is isolated from internal acceleration-related stresses or disturbances of the payload container.

17. A payload suspension system for producing a simulated zero-gravity environment for a suspended payload during a parabolic flight maneuver of an aircraft, the payload suspension system comprising:
a frame defining an internal cavity;
a payload container positioned within the internal cavity and configured to hold a payload;
a set of tensile members, each tensile member of the set of tensile members coupling a respective portion of the payload container to the frame thereby suspending the payload container within the internal cavity; and
a control system configured to:
detect a first transition of the aircraft from a first non-parabolic flight condition to a parabolic flight condition and, in response to detecting the first transition cause a reduction in a tension in the set of tensile members; and
detect a second transition of the aircraft from the parabolic flight condition to a second non-parabolic flight condition and, in response to detecting the second transition cause an increase in the tension in the set of tensile members.

18. The payload suspension system of claim 17, wherein, prior to detecting the first transition, each tensile member of the set of tensile members is under tension thereby impeding motion of the payload container within the internal cavity of the frame.

19. The payload suspension system of claim 17, wherein, at a period of time between detecting the first transition and detecting the second transition, at least two tensile members of the set of tensile members are at a zero or near-zero tension.

20. The payload suspension system of claim 19, wherein, at a period of time between detecting the first transition and detecting the second transition, each tensile members of the set of tensile members is at a zero or near-zero tension.

* * * * *